(12) United States Patent
Li et al.

(10) Patent No.: US 12,204,033 B2
(45) Date of Patent: Jan. 21, 2025

(54) MULTIMODAL DETECTION WITH INTEGRATED SENSORS

(71) Applicant: Innovusion, Inc., Sunnyvale, CA (US)

(72) Inventors: Yimin Li, Cupertino, CA (US); Haosen Wang, Sunnyvale, CA (US); Yang Han, Cupertino, CA (US); Zhaoqiang Peng, Sunnyvale, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

(21) Appl. No.: 18/123,207

(22) Filed: Mar. 17, 2023

(65) Prior Publication Data

US 2023/0305160 A1    Sep. 28, 2023

Related U.S. Application Data

(60) Provisional application No. 63/323,962, filed on Mar. 25, 2022, provisional application No. 63/432,990, filed on Dec. 15, 2022.

(51) Int. Cl.
*G01S 17/931* (2020.01)
*G01S 7/481* (2006.01)
*G01S 17/89* (2020.01)

(52) U.S. Cl.
CPC .......... *G01S 17/931* (2020.01); *G01S 7/4815* (2013.01); *G01S 7/4816* (2013.01); *G01S 7/4817* (2013.01); *G01S 17/89* (2013.01)

(58) Field of Classification Search
None
See application file for complete search history.

(56) References Cited

U.S. PATENT DOCUMENTS

| 3,897,150 A | 7/1975 | Bridges et al. |
| 4,464,048 A | 8/1984 | Farlow |

(Continued)

FOREIGN PATENT DOCUMENTS

| CN | 1677050 A | 10/2005 |
| CN | 204758260 U | 11/2015 |

(Continued)

OTHER PUBLICATIONS

"Mirrors", Physics LibreTexts, https://phys.libretexts.org/Bookshelves/Optics/Supplemental_Modules_(Components)/Mirrors, (2021), 2 pages.

(Continued)

*Primary Examiner* — Hovhannes Baghdasaryan
(74) *Attorney, Agent, or Firm* — MASCHOFF BRENNAN; Liang Huang

(57) ABSTRACT

A system for multimodal detection is provided. The system comprises a light collection and distribution device configured to perform at least one of collecting light signals from a field-of-view (FOV) and distributing the light signals to a plurality of detectors. The light signals have a plurality of wavelengths comprising at least a first wavelength and a second wavelength. The system further comprises a multimodal sensor comprising the plurality of detectors. The plurality of detectors comprises at least a light detector of a first type and a light detector of a second type. The light detector of the first type is configured to detect light signals having a first light characteristic. The light detector of the first type is configured to perform distance measuring based on light signals having the first wavelength. The light detector of the second type is configured to detect light signals having a second light characteristic.

29 Claims, 20 Drawing Sheets

(56) References Cited

U.S. PATENT DOCUMENTS

| | | |
|---|---|---|
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,584,000 B1 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,375,803 B1 | 5/2008 | Bamji |
| 7,440,084 B2 | 10/2008 | Kane |
| 7,440,175 B2 | 10/2008 | Di Teodoro et al. |
| 7,489,885 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,882,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,318,724 B2 | 4/2016 | Gehring et al. |
| 9,354,485 B2 | 5/2016 | Fermann et al. |
| 9,510,505 B2 | 12/2016 | Halloran et al. |
| 9,557,856 B2 | 1/2017 | Send et al. |
| 9,575,184 B2 | 2/2017 | Gilliland et al. |
| 9,805,998 B2 | 3/2017 | Nozawa |
| 9,821,878 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,278 B2 | 1/2018 | Uffelen et al. |
| 9,880,283 B2 | 1/2018 | Droz et al. |
| 9,885,778 B2 | 2/2018 | Dussan |
| 9,897,889 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,081,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,397,497 B1 * | 8/2019 | Graves .............. H04N 23/11 |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,672 B2 | 5/2020 | Dussan et al. |
| 10,663,596 B2 | 5/2020 | Dussan et al. |
| 10,683,564 B1 | 5/2020 | LaChapelle |
| 10,683,585 B2 | 5/2020 | McWhirter |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,805 B2 | 5/2021 | Li et al. |
| 11,194,048 B1 | 12/2021 | Burbank et al. |
| 2002/0136251 A1 | 9/2002 | Green et al. |
| 2004/0119020 A1 * | 6/2004 | Bodkin .............. G01J 3/0208 |
| | | 250/353 |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 * | 3/2009 | Willner .............. G01S 17/58 |
| | | 356/5.01 |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0208244 A1 | 8/2010 | Earhart et al. |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0044476 A1 | 2/2012 | Earhart et al. |
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241781 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |

(56) References Cited

U.S. PATENT DOCUMENTS

| | | |
|---|---|---|
| 2014/0104594 A1 | 4/2014 | Gammenthaler |
| 2014/0347850 A1 | 11/2014 | Bosch |
| 2014/0350836 A1 | 11/2014 | Steltner et al. |
| 2015/0078123 A1 | 3/2015 | Batcheller et al. |
| 2015/0084805 A1 | 3/2015 | Dawber |
| 2015/0109803 A1 | 4/2015 | Kim et al. |
| 2015/0116892 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0227193 A1* | 8/2016 | Osterwood ............ G01S 17/42 |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0003392 A1* | 1/2017 | Bartlett ............... G01S 17/10 |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0363741 A1* | 12/2017 | Send ................. G01S 7/4816 |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0113200 A1* | 4/2018 | Steinberg ........... G02B 26/0858 |
| 2018/0152891 A1 | 5/2018 | Pacala et al. |
| 2018/0158471 A1 | 6/2018 | Vaughn et al. |
| 2018/0164439 A1 | 6/2018 | Droz et al. |
| 2018/0180733 A1* | 6/2018 | Smits ................. G06T 7/70 |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0205859 A1* | 7/2018 | Dornblut ............ H04N 23/55 |
| 2018/0210064 A1* | 7/2018 | Send ................. G01S 11/12 |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329080 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107823 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0166355 A1 | 5/2019 | Banks et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310388 A1 | 10/2019 | LaChapelle |
| 2019/0369215 A1 | 12/2019 | Wang et al. |
| 2019/0369258 A1 | 12/2019 | Hall et al. |
| 2019/0376890 A1* | 12/2019 | Bennett ............... G06T 7/73 |
| 2019/0383915 A1 | 12/2019 | Li et al. |
| 2020/0142070 A1 | 5/2020 | Hall et al. |
| 2020/0166637 A1* | 5/2020 | Hess ................. G01S 7/032 |
| 2020/0256964 A1 | 8/2020 | Campbell et al. |
| 2020/0260066 A1 | 8/2020 | Liu |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 108597471 B | 5/2019 |
| CN | 110035269 A * | 7/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211855309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215841806 U | 1/2022 |
| CN | 112639527 B | 2/2022 |
| CN | 215932142 U | 3/2022 |
| CN | 112578396 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| EP | 3477338 A1 | 5/2019 |
| GB | 1 427 164 A | 3/1976 |
| GB | 2000411 | 1/1979 |
| GN | 204885804 U | 12/2015 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018175990 | 9/2018 |

(56) References Cited

FOREIGN PATENT DOCUMENTS

| WO | 2018182812 A2 | 10/2018 |
|---|---|---|
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

"Why Wavelengths Matter in Fiber Optics", FirstLight, https://www.firstlight.nel/why-wavelengths-matter-in-fiber-optics/, (2021), 5 pages.
Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D Lidar imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.

* cited by examiner

MULTIMODAL DETECTION WITH INTEGRATED SENSORS

CROSS-REFERENCE TO RELATED APPLICATIONS

This application claims priority to U.S. Provisional patent application Ser. No. 63/432,990, filed Dec. 15, 2022, entitled "MULTIMODAL DETECTION WITH INTEGRATED SENSORS"; and U.S. Provisional patent application Ser. No. 63/323,962, filed Mar. 25, 2022, entitled "COMPACT PERCEPTION MODULE." This application is related to U.S. patent application Ser. No. 18/105,781, filed Feb. 3, 2023, entitled "COMPACT PERCEPTION MODULE." The contents of all applications are hereby incorporated by reference in their entireties for all purposes.

FIELD OF THE TECHNOLOGY

This disclosure relates generally to optical sensing and, more particularly, to systems and methods for multimodal detection with integrated sensors.

BACKGROUND

Light detection and ranging (LiDAR) systems use light pulses to create an image or point cloud of the external environment. A LiDAR system may be a scanning or non-scanning system. Some typical scanning LiDAR systems include a light source, a light transmitter, a light steering system, and a light detector. The light source generates a light beam that is directed by the light steering system in particular directions when being transmitted from the LiDAR system. When a transmitted light beam is scattered or reflected by an object, a portion of the scattered or reflected light returns to the LiDAR system to form a return light pulse. The light detector detects the return light pulse. Using the difference between the time that the return light pulse is detected and the time that a corresponding light pulse in the light beam is transmitted, the LiDAR system can determine the distance to the object based on the speed of light. This technique of determining the distance is referred to as the time-of-flight (ToF) technique. The light steering system can direct light beams along different paths to allow the LiDAR system to scan the surrounding environment and produce images or point clouds. A typical non-scanning LiDAR system illuminates an entire field-of-view (FOV) rather than scanning through the FOV. An example of the non-scanning LiDAR system is a flash LiDAR, which can also use the ToF technique to measure the distance to an object. LiDAR systems can also use techniques other than time-of-flight and scanning to measure the surrounding environment.

SUMMARY

In one embodiment of the present disclosure, a system for multimodal detection is provided. The system comprises a light collection and distribution device configured to perform at least one of collecting light signals from a field-of-view (FOV) and distributing the light signals to a plurality of detectors. The light signals have a plurality of wavelengths comprising at least a first wavelength and a second wavelength. The second wavelength is different from the first wavelength. The system further comprises a multimodal sensor comprising the plurality of detectors. The plurality of detectors comprises at least a light detector of a first type and a light detector of a second type. The light detector of the first type is configured to detect light signals having a first light characteristic of a plurality of light characteristics. The light detector of the first type is configured to perform distance measuring based on light signals having the first wavelength. The light detector of the second type is configured to detect light signals having a second light characteristic of the plurality of light characteristics. The first light characteristic is different from the second light characteristic.

In one embodiments of the present disclosure, a method performed by a multimodal detection system is provided. The multimodal detection system comprises a light collection and distribution device and a multimodal sensor comprising a plurality of detectors having at least a light detector of a first type and a light detector of a second type. The method comprises performing, by the light collection and distribution device, at least one of collecting light signals from a field-of-view (FOV) and distributing the light signals to a plurality of detectors. The light signals have a plurality of wavelengths comprising at least a first wavelength and a second wavelength. The second wavelength is different from the first wavelength. The method further comprises detecting, by the light detector of the first type, light signals having a first light characteristic of the plurality of different light characteristics; and detecting, by the light detector of the second type, light signals having a second light characteristic of the plurality of different light characteristics. The first light characteristic is different from the second light characteristic.

BRIEF DESCRIPTION OF THE DRAWINGS

The present application can be best understood by reference to the embodiments described below taken in conjunction with the accompanying drawing figures, in which like parts may be referred to by like numerals.

DETAILED DESCRIPTION

Figure 1:
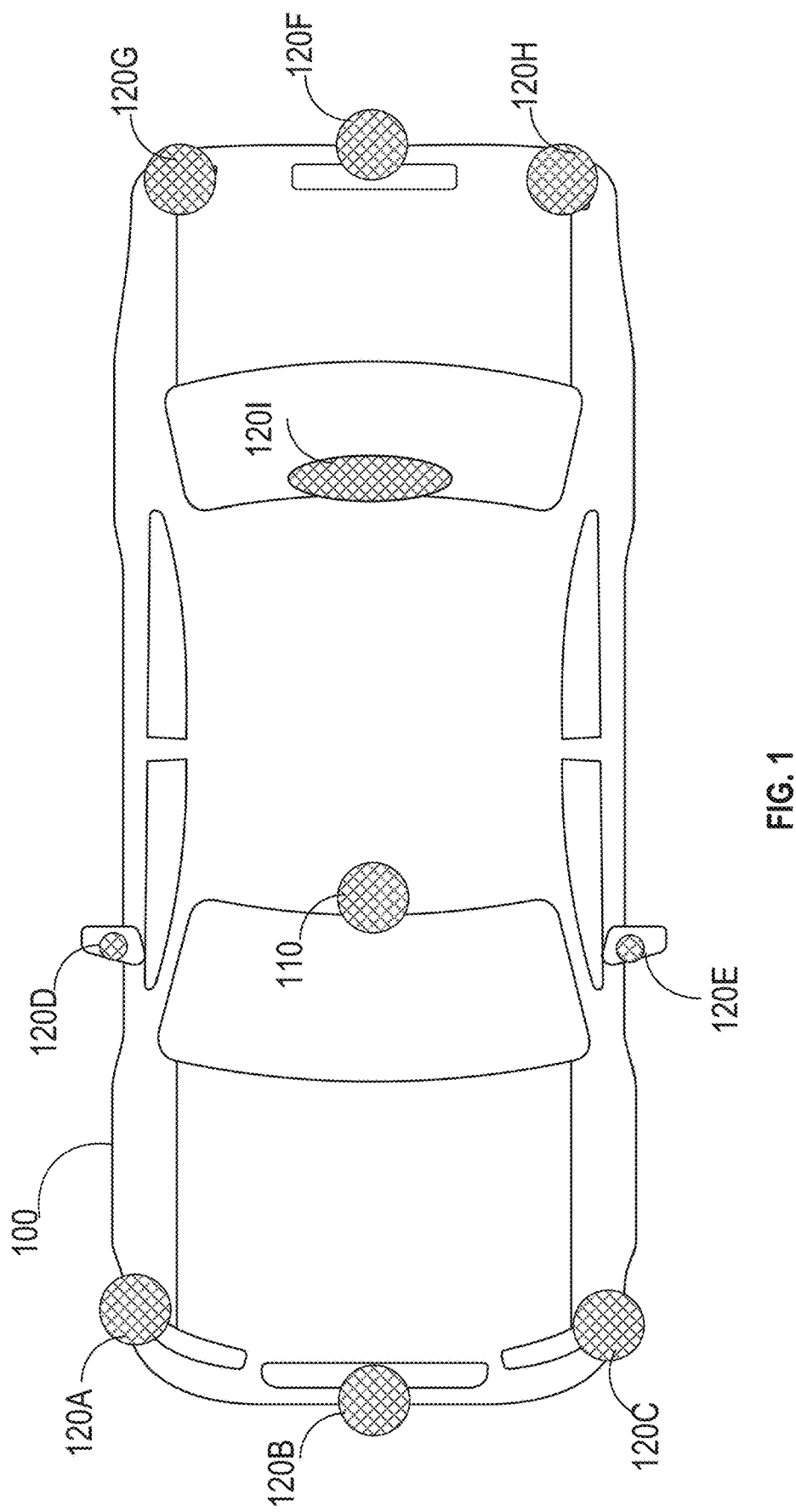
FIG. 1 illustrates one or more example LiDAR systems disposed or included in a motor vehicle.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR device can perform distance ranging while a video sensor (e.g., a camera) can provide physical information such as color, intensity, and temperature, etc. In some examples, a video sensor can provide higher resolution than a LiDAR device. There are benefits to fuse information generated by a video sensor and a LiDAR sensor (and one or more other sensors). Three layers of fusion can be realized to combine video sensor and LiDAR sensor in artificial decision making. The first layer is the hardware data collection level fusion; the second layer is the fusion of perception from each individual sensor or sensor category; and the third layer is the fusion of decision from each sensor or sensor category with weight. The present disclosure describes a hardware layer fusion providing point scanning or line scanning video sensor and LiDAR sensor fusion, and/or mixed combination of point scanning/line scanning by video and LiDAR sensors.

Point scanning and line scanning are two frequently-used scanning methodologies for a LiDAR sensor as of today. Point scanning or line scanning can also be used in thermal imaging, video imaging, and/or other sensing/imaging technologies. A video sensor capable of point scanning or line scanning can achieve better performance such as an improved detection limit and a larger dynamic range, etc. A discrete video sensor capable of point/line scanning may be costly nowadays. A point scanning or line scanning enabled video sensor can be integrated with the LiDAR technology, thereby reducing the overall cost. An integrated LiDAR and video sensor can operate in the same or adjacent spectral range or different spectral ranges. In an integrated sensor, the detection components from the LiDAR or video sensors may occupy the same or vicinity of the same focal plane or a mirrored virtual focal plane. For LiDAR and video sensors operable in different broad spectral ranges, broadband reflective optics or wavelength-selective refractive optics can be used. Detector signals from each category can be communicated to a same processing component or device after certain signal conditioning and conversion. All data can be processed at the same layer and combined, thereby realizing data fusion in an efficient way. In some examples, different types of output data of the integrated sensor can be combined into multi-dimension data for each single data point. For example, the multi-dimension data may include data related to the light angle, object distance, color, intensity, temperature, time stamp, etc. Such data format for multi-dimension data may be called "Muxel" or multiplexing pixel, which may be different from pixel (discrete elements that together constitute an image) or voxel (discrete elements comprising a three-dimensional entity). Embodiments of present invention are described below.

FIG. 1 illustrates one or more example LiDAR systems 110 disposed or included in a motor vehicle 100. Vehicle 100 can be a car, a sport utility vehicle (SUV), a truck, a train, a wagon, a bicycle, a motorcycle, a tricycle, a bus, a mobility scooter, a tram, a ship, a boat, an underwater vehicle, an airplane, a helicopter, a unmanned aviation vehicle (UAV), a spacecraft, etc. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-120I. Each of LiDAR systems 110 and 120A-120I can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is a frequently-used sensor of a vehicle that is at least partially automated. In one embodiment, as shown in FIG. 1, motor vehicle 100 may include a single LiDAR system 110 (e.g., without LiDAR systems 120A-120I) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-120I. As shown in FIG. 1, in one embodiment, multiple LiDAR systems 110 and/or 120A-120I are attached to vehicle 100 at different locations of the vehicle. For example, LiDAR system 120A is attached to vehicle 100 at the front right corner; LiDAR system 120B is attached to vehicle 100 at the front center position; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center position; LiDAR system 120G is attached to vehicle 100 at the back right corner; LiDAR system 120H is attached to vehicle 100 at the back left corner; and/or LiDAR system 120D is attached to vehicle 100 at the center towards the backend (e.g., back end of the vehicle roof). It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

In some embodiments, LiDAR systems 110 and 120A-120I are independent LiDAR systems having their own respective laser sources, control electronics, transmitters, receivers, and/or steering mechanisms. In other embodiments, some of LiDAR systems 110 and 120A-120I can share one or more components, thereby forming a distributed sensor system. In one example, optical fibers are used to deliver laser light from a centralized laser source to all LiDAR systems. For instance, system 110 (or another system that is centrally positioned or positioned anywhere inside the vehicle 100) includes a light source, a transmitter, and a light detector, but have no steering mechanisms. System 110 may distribute transmission light to each of systems 120A-120I. The transmission light may be distributed via optical fibers. Optical connectors can be used to couple the optical fibers to each of system 110 and 120A-120I. In some examples, one or more of systems 120A-120I include steering mechanisms but no light sources, transmitters, or light detectors. A steering mechanism may include one or more moveable mirrors such as one or more polygon mirrors, one or more single plane mirrors, one or more multi-plane mirrors, or the like. Embodiments of the light source, transmitter, steering mechanism, and light detector are described in more detail below. Via the steering mechanisms, one or more of systems 120A-120I scan light into one or more respective FOVs and receive corresponding return light. The return light is formed by scattering or reflecting the transmission light by one or more objects in the FOVs. Systems 120A-120I may also include collection lens and/or other optics to focus and/or direct the return light into optical fibers, which deliver the received return light to system 110. System 110 includes one or more light detectors for detecting the received return light. In some examples, system 110 is disposed inside a vehicle such that it is in a temperature-controlled environment, while one or more systems 120A-120I may be at least partially exposed to the external environment.

Figure 2:
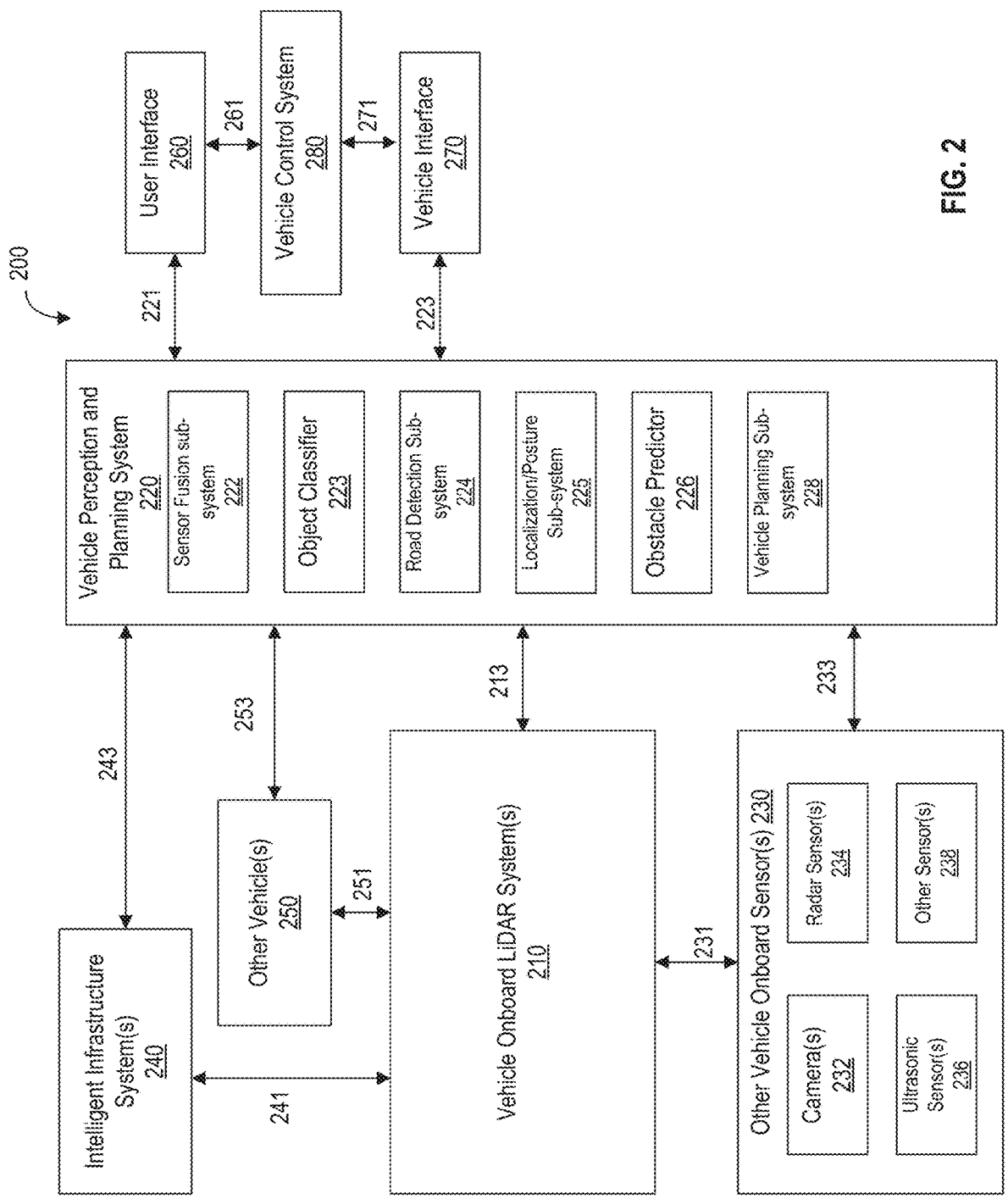
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-50 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 70-200 meters from the LiDAR sensor. Medium-range LiDAR sensors can be used for, e.g., monitoring road intersections, assistance for merging onto or leaving a freeway, or the like. A long-range LiDAR sensor measures objects located up to about 200 meters and beyond. Long-range LiDAR sensors are typically used when a vehicle is travelling at a high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are configured to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera includes image sensors that facilitates producing monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data. Camera(s) 232 can be mount on, or integrated to, a vehicle at any locations (e.g., rear-view mirrors, pillars, front grille, and/or back bumpers, etc.).

Other vehicle onboard sensor(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations. Radar sensor(s) 234 can be mount on, or integrated to, a vehicle at any locations (e.g., rear-view mirrors, pillars, front grille, and/or back bumpers, etc.).

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, checking blind spots, identifying parking spaces, providing lane changing assistance into traffic, or the like. Sensor data generated by ultrasonic sensor(s) 236 can also be provided to vehicle perception and planning system 220 via communication path 233 for further processing and controlling the vehicle operations. Ultrasonic sensor(s) 236 can be mount on, or integrated to, a vehicle at any locations (e.g., rearview mirrors, pillars, front grille, and/or back bumpers, etc.).

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud or edge computing service provider for processing and then the processing results can be transmitted back to the vehicle perception and planning system 220 and/or LiDAR system 210).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210 (or with other LiDAR systems located in other vehicles), thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffic in the opposite direction. In such a situation, sensors of intelligent infrastructure system(s) 240 can provide useful data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can use any computer vision techniques to detect and classify the objects and estimate the positions of the objects. In some embodiments, object classifier 223 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include one or more planners such as a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. In some examples, vehicle perception and planning system 220 may further comprise a user interface 260, which provides a user (e.g., a driver) access to vehicle control system 280 to, for example, override or take over control of the vehicle when necessary. User interface 260 may also be separate from vehicle perception and planning system 220. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
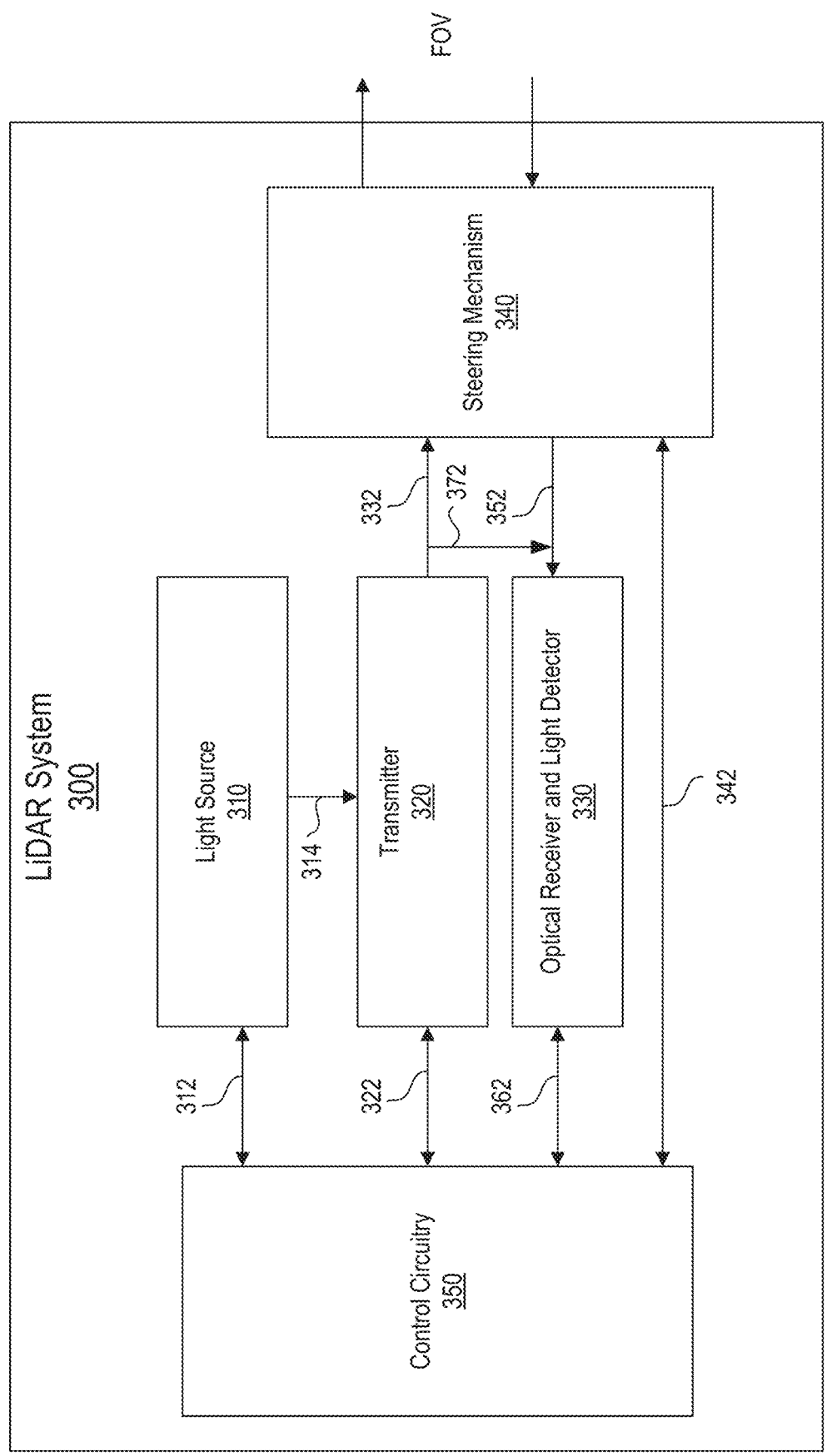
FIG. 3 is a block diagram illustrating an example LiDAR system.

FIG. 3 is a block diagram illustrating an example LiDAR system 300. LiDAR system 300 can be used to implement LiDAR systems 110, 120A-120I, and/or 210 shown in FIGS. 1 and 2. In one embodiment, LiDAR system 300 comprises a light source 310, a transmitter 320, an optical receiver and light detector 330, a steering system 340, and a control circuitry 350. These components are coupled together using communications paths 312, 314, 322, 332, 342, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between light source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

In some embodiments, LiDAR system 300 can be a coherent LiDAR system. One example is a frequency-modulated continuous-wave (FMCW) LiDAR. Coherent LiDARs detect objects by mixing return light from the objects with light from the coherent laser transmitter. Thus, as shown in FIG. 3, if LiDAR system 300 is a coherent LiDAR, it may include a route 372 providing a portion of transmission light from transmitter 320 to optical receiver and light detector 330. The transmission light provided by transmitter 320 may be modulated light and can be split into two portions. One portion is transmitted to the FOV, while the second portion is sent to the optical receiver and light detector of the LiDAR system. The second portion is also referred to as the light that is kept local (LO) to the LiDAR system. The transmission light is scattered or reflected by various objects in the FOV and at least a portion of it forms return light. The return light is subsequently detected and interferometrically recombined with the second portion of the transmission light that was kept local. Coherent LiDAR provides a means of optically sensing an object's range as well as its relative velocity along the line-of-sight (LOS).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Light source 310 outputs laser light for illuminating objects in a field of view (FOV). The laser light can be infrared light having a wavelength in the range of 700 nm to 1 mm. Light source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), an external-cavity diode laser, a vertical-external-cavity surface-emitting laser, a distributed feedback (DFB) laser, a distributed Bragg reflector (DBR) laser, an interband cascade laser, a quantum cascade laser, a quantum well laser, a double heterostructure laser, or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, light source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, light source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals. In some examples, light source 310 may have multiple amplification stages to achieve a high power gain such that the laser output can have high power, thereby enabling the LiDAR system to have a long scanning range. In some examples, the power amplifier of light source 310 can be controlled such that the power gain can be varied to achieve any desired laser output power.

Figure 4:
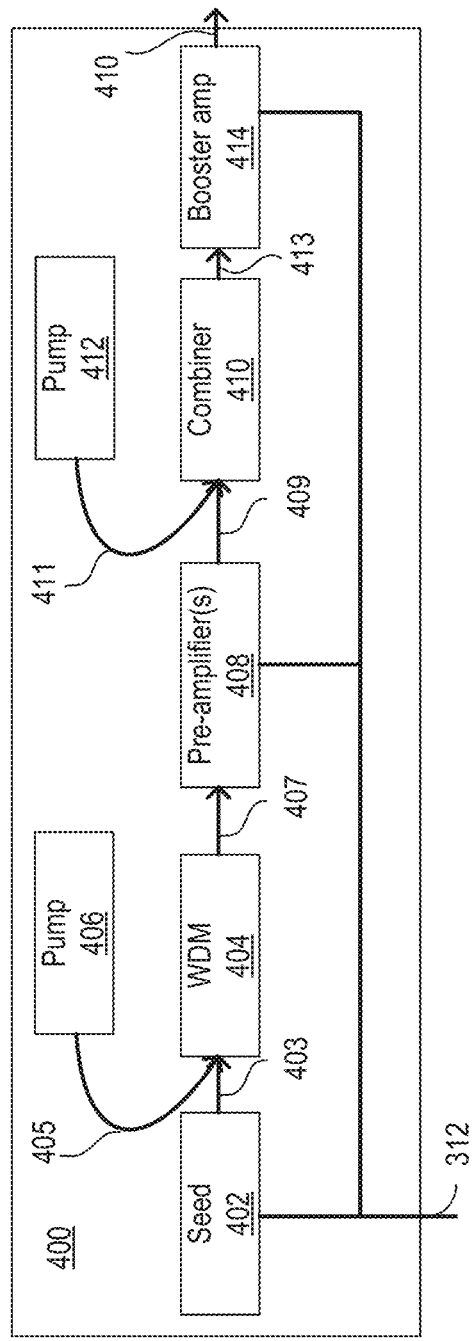
FIG. 4 is a block diagram illustrating an example fiber-based laser source.

FIG. 4 is a block diagram illustrating an example fiber-based laser source 400 having a seed laser and one or more pumps (e.g., laser diodes) for pumping desired output power. Fiber-based laser source 400 is an example of light source 310 depicted in FIG. 3. In some embodiments, fiber-based laser source 400 comprises a seed laser 402 to generate initial light pulses of one or more wavelengths (e.g., infrared wavelengths such as 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 10-30 dB gain). In some embodiments, pre-amplifier(s) 408 are low noise amplifiers. Pre-amplifier(s) 408 output to an optical combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides combined optical signals to a booster amplifier 414, which produces output light pulses via optical fiber 410. The booster amplifier 414 provides further amplification of the optical signals (e.g., another 20-40 dB). The outputted light pulses can then be transmitted to transmitter 320 and/or steering mechanism 340 (shown in FIG. 3). It is understood that FIG. 4 illustrates one example configuration of fiber-based laser source 400. Laser source 400 can have many other configurations using different combinations of one or more components shown in FIG. 4 and/or other components not shown in FIG. 4 (e.g., other components such as power supplies, lens(es), filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based laser source 400. Fiber-based laser source 400 can also include other components not shown, such as one or more power connectors, power supplies, and/or power lines.

Referencing FIG. 3, typical operating wavelengths of light source 310 comprise, for example, about 850 nm, about 905 nm, about 940 nm, about 1064 nm, and about 1550 nm. For laser safety, the upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from light source 310 can be characterized by its peak power, average power, pulse energy, and/or the pulse energy density. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. In general, the smaller the time interval between the pulses, the higher the PRR. The PRR typically corresponds to the maximum range that a LiDAR system can measure. Light source 310 can be configured to produce pulses at high PRR to meet the desired number of data points in a point cloud generated by the LiDAR system. Light source 310 can also be configured to produce pulses at medium or low PRR to meet the desired maximum detection distance. Wall plug efficiency (WPE) is another factor to evaluate the total power consumption, which may be a useful indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring light source 310 and/or designing laser delivery systems for vehicle-mounted LiDAR applications.

It is understood that the above descriptions provide non-limiting examples of a light source 310. Light source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Light source 310 provides laser light (e.g., in the form of a laser beam) to transmitter 320. The laser light provided by light source 310 can be amplified laser light with a predetermined or controlled wavelength, pulse repetition rate, and/or power level. Transmitter 320 receives the laser light from light source 310 and transmits the laser light to steering mechanism 340 with low divergence. In some embodiments, transmitter 320 can include, for example, optical components (e.g., lens, fibers, mirrors, etc.) for transmitting one or more laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by light source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, light source 310 and/or transmitter 320 can be configured to meet, for example, a scan resolution requirement while maintaining the desired $M^2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. A horizontal dimension can be a dimension that is parallel to the horizon or a surface associated with the LiDAR system or a vehicle (e.g., a road surface). A vertical dimension is perpendicular to the horizontal dimension (i.e., the vertical dimension forms a 90-degree angle with the horizontal dimension). Steering mechanism 340 will be described in more detail below. The laser light scanned to an FOV may be scattered or reflected by an object in the FOV. At least a portion of the scattered or reflected light forms return light that returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focusing, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One example method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, an APD (avalanche photodiode) based structure, a PMT (photomultiplier tube) based structure, a SiPM (Silicon photomultiplier) based structure, a SPAD (single-photon avalanche diode) based structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise. In some embodiments, optical receiver and light detector 330 may include a pre-amplifier that is a low noise amplifier (LNA). In some embodiments, the pre-amplifier may also include a transimpedance amplifier (TIA), which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implementing signal processing techniques (e.g., filtering, noise reduction, amplification, or the like). For example, in addition to, or instead of, using direct detection of return signals (e.g., by using ToF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism, a scanning mechanism, or simply a light scanner. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an example non-scanning LiDAR system).

Steering mechanism 340 can be used with a transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), single-plane or multi-plane mirror(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or multiple scanning devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s), or a combination thereof, for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lenses) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or completely overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling light source 310 to obtain the desired laser pulse timing, the pulse repetition rate, and power; controlling steering mechanism 340 (e.g., controlling the speed, direction, and/or other parameters) to scan the FOV and maintain pixel registration and/or alignment; controlling optical receiver and light detector 330 (e.g., controlling the sensitivity, noise reduction, filtering, and/or other parameters) such that it is an optimal state; and monitoring overall system health/status for functional safety (e.g., monitoring the laser output power and/or the steering mechanism operating status for safety).

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; derives the reflectivity of an object in the FOV, and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed and/or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), fairing(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one example LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
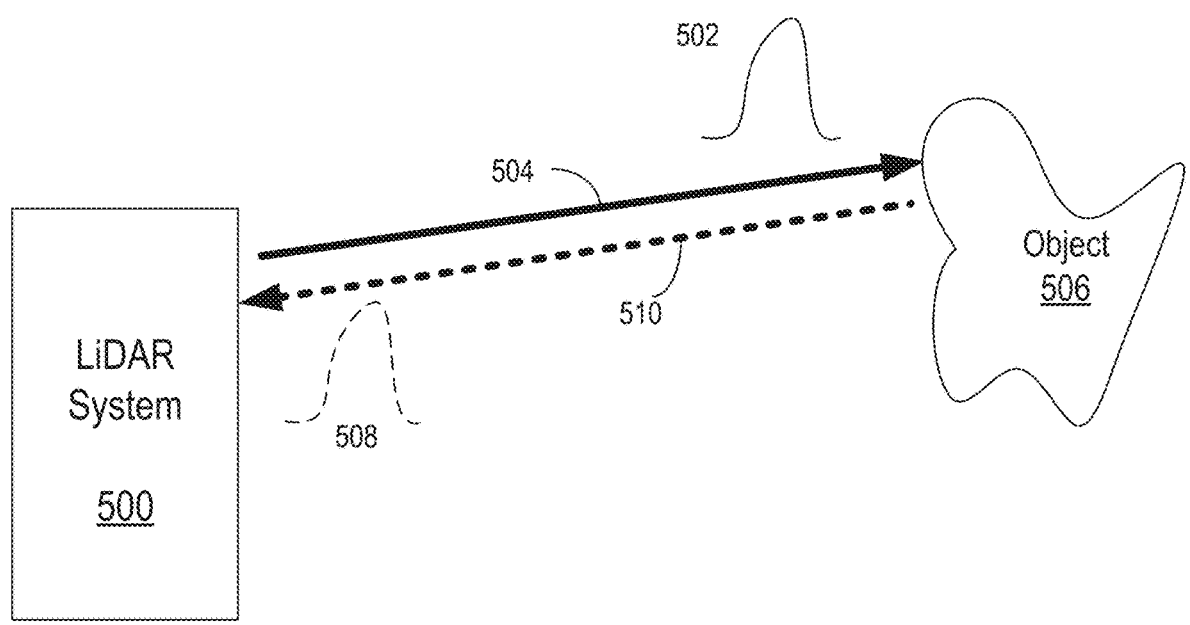
FIGS. 5A-5C illustrate an example LiDAR system using pulse signals to measure distances to objects disposed in a field-of-view (FOV).

As described above, some LiDAR systems use the time-of-flight (ToF) of light signals (e.g., light pulses) to determine the distance to objects in a light path. For example, with reference to FIG. 5A, an example LiDAR system 500 includes a laser light source (e.g., a fiber laser), a steering mechanism (e.g., a system of one or more moving mirrors), and a light detector (e.g., a photodetector with one or more optics). LiDAR system 500 can be implemented using, for example, LiDAR system 300 described above. LiDAR system 500 transmits a light pulse 502 along light path 504 as determined by the steering mechanism of LiDAR system 500. In the depicted example, light pulse 502, which is generated by the laser light source, is a short pulse of laser light. Further, the signal steering mechanism of the LiDAR system 500 is a pulsed-signal steering mechanism. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to form a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
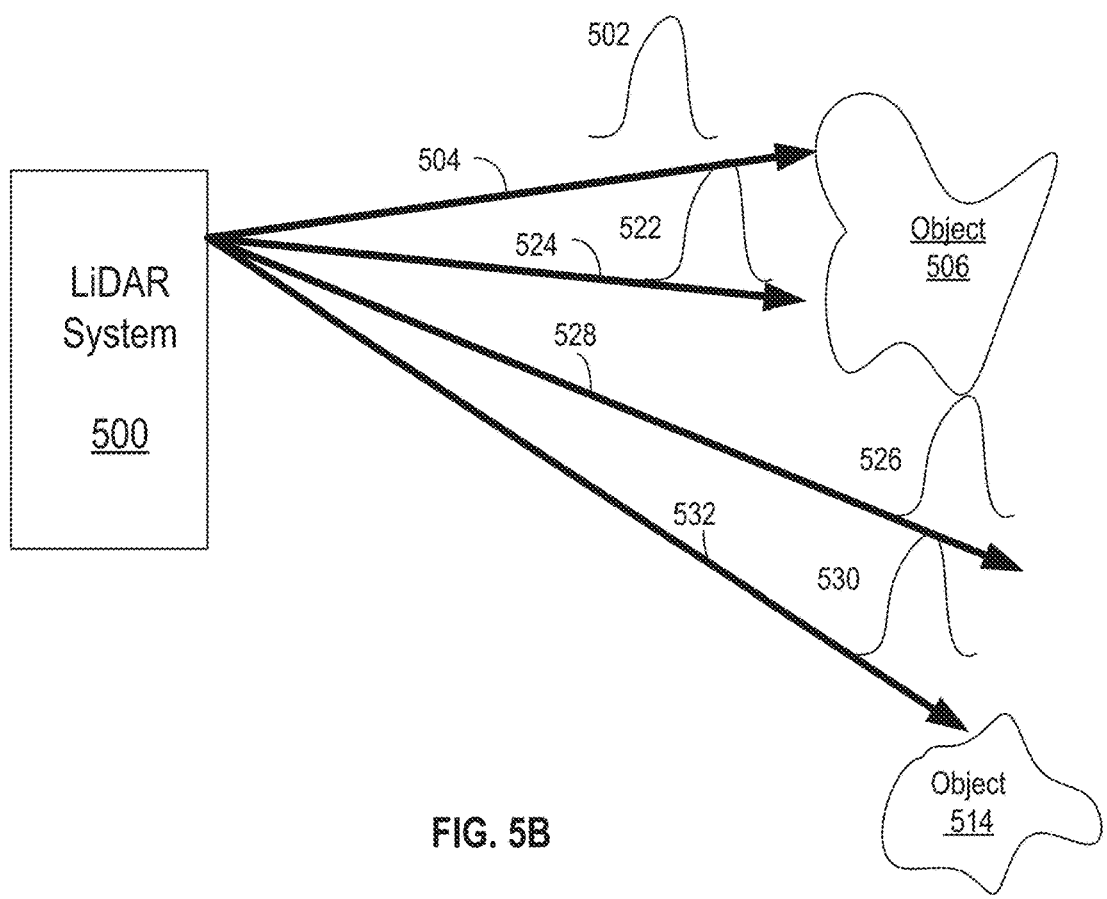
Figure 5C:
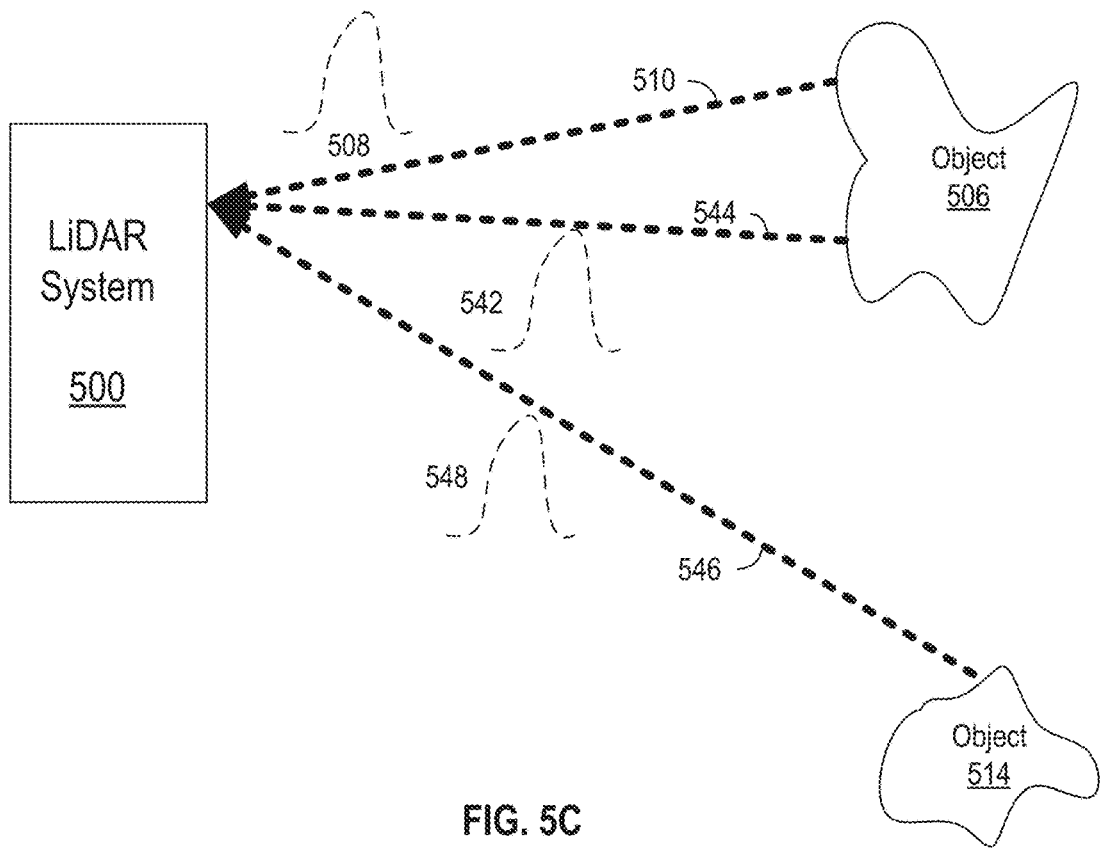

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are formed by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then LiDAR system 500 may determine that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. That is, LiDAR system 500 can be configured to perform a point scan, a line scan, a one-shot without scanning, or a combination thereof. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source in the LiDAR system may have a higher pulse repetition rate (PRR). On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an example LiDAR system that can transmit laser pulses with a pulse repetition rate between 500 kHz and 1 MHz. Based on the time it takes for a pulse to return to the LiDAR system and to avoid mix-up of return pulses from consecutive pulses in a typical LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques (e.g., pulse encoding techniques) are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of at least some of the FIGS. 1-22, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
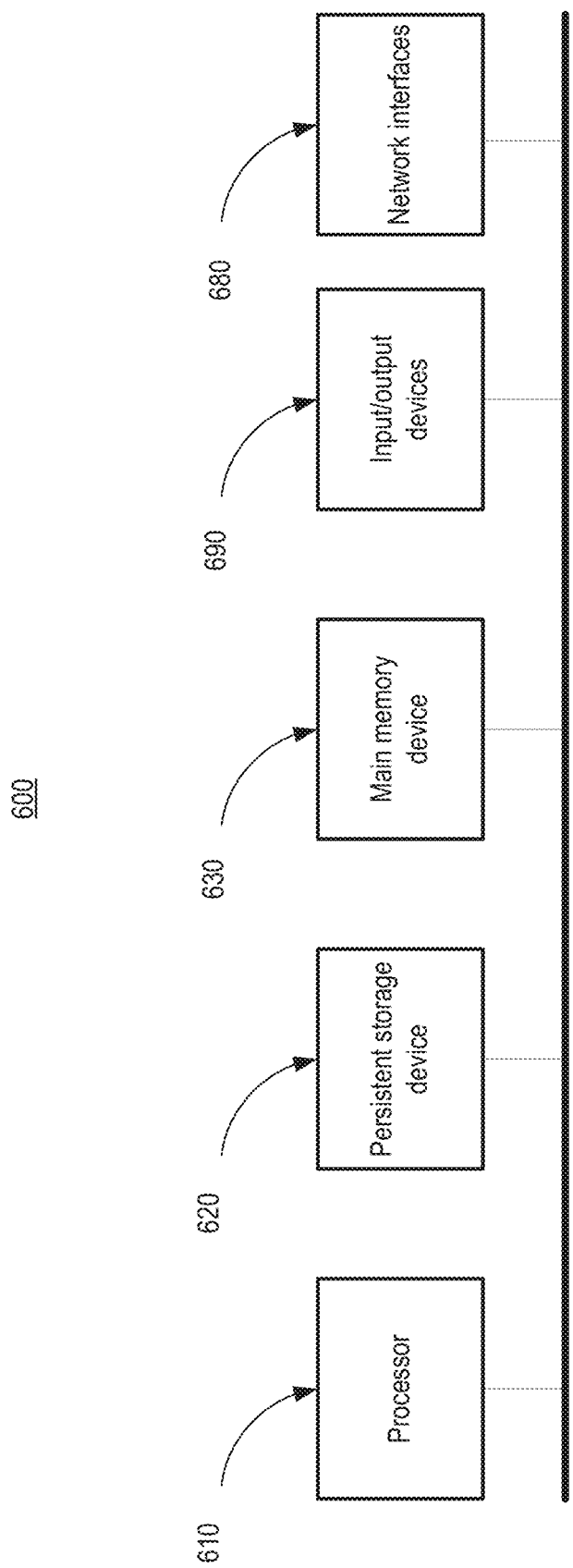
FIG. 6 is a block diagram illustrating an example apparatus used to implement systems, apparatus, and methods in various embodiments.

A high-level block diagram of an example apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of at least some of FIGS. 1-22 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps discussed herein in connection with at least some of FIGS. 1-22. Accordingly, by executing the computer program instructions, the processor 610 executes an algorithm defined by the method steps of these aforementioned figures. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
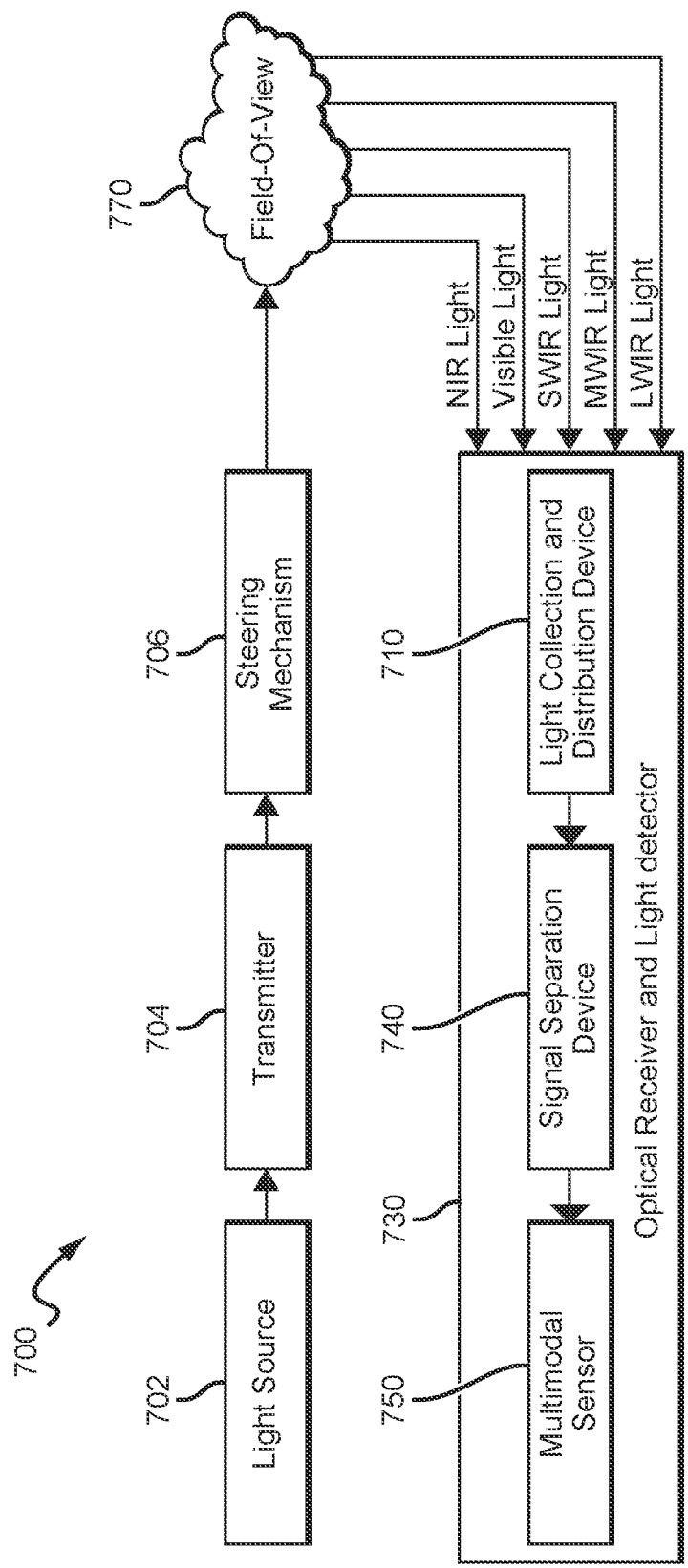
FIG. 7 is a block diagram illustrating an exemplary multimodal detection system with integrated sensors, according to various embodiments.

FIG. 7 is a block diagram illustrating an exemplary multimodal detection system 700 with integrated sensors, according to various embodiments. Multimodal detection system 700 can be a part of a LiDAR system (e.g., system 300) or includes a part of a LiDAR system (e.g., system 300). System 700 can also include one or more other sensors such as cameras. As shown in FIG. 7, in some embodiments, on the transmission side, system 700 can include a light source 702, a transmitter 704, and a steering mechanism 706. On the receiver side, system 700 can include an optical receiver and light detector 730, which comprises one or more of a light collection and distribution device 710, a signal separation device 740, and a multimodal sensor 750. Light source 702, transmitter 704, and steering mechanism 706 can be implemented using light source 310, transmitter 320, and steering mechanism 340, respectively, as described above in connection with FIG. 3. In some examples, light source 702 is an internal light source that generates light for the multimodal detection system 700. Examples of internal light sources include active illumination devices such as laser (e.g., fiber laser or semiconductor based laser used in one or more LiDAR transmission channels of system 700), light emitting diodes, headlights/taillights, etc. In some examples, system 700 also receives light from light sources that are external to system 700. These external light sources may not be a part of the system 700. Examples of external light sources include sunlight, streetlight, and other illuminations from light sources external to system 700 (e.g., light from other LiDARs).

As illustrated in FIG. 7, light generated by light source 702 (e.g., laser from a LiDAR system) is provided to transmitter 704. The light generated by light source 702 can include visible light, near infrared (NIR) light, short wavelength IR (SWIR) light, medium wavelength IR (MWIR) light, long wavelength IR (LWIR) light, and/or light in any other wavelengths. The visible light has a wavelength range of about 400 nm-700 nm; the near infrared (NIR) light has a wavelength range of about 700 nm-1.4 μm; the short-wavelength infrared (SWIR) has a wavelength range of about 1.4 μm-3 μm; the mid-wavelength infrared (MWIR) has a wavelength range of about 3 μm-8 μm; and a long-wavelength infrared (LWIR) has a wavelength range of about 8 μm-15 μm.

As described above, in some examples, transmitter 704 can include one or more transmission channels, each carrying a light beam. The transmitter 704 may also include one or more optics (e.g., mirrors, lens, fiber arrays, etc.) and/or electrical components (e.g., PCB board, power supply, actuators, etc.) to form the transmission channels. Transmitter 704 can transmit the light from each channel to a steering mechanism 706, which scans the light from each channel to an FoV 770. Steering mechanism 706 may include one or more optical or electrical scanners configured to perform at least one of a point scan or a line scan of the FoV 770. Light source 702, transmitter 704, and steering mechanism 706 may be a part of a LiDAR system that scans light into FoV 770. The scanning performed by steering mechanism 706 can include, for example, line scanning and/or point scanning.

Figure 8A:
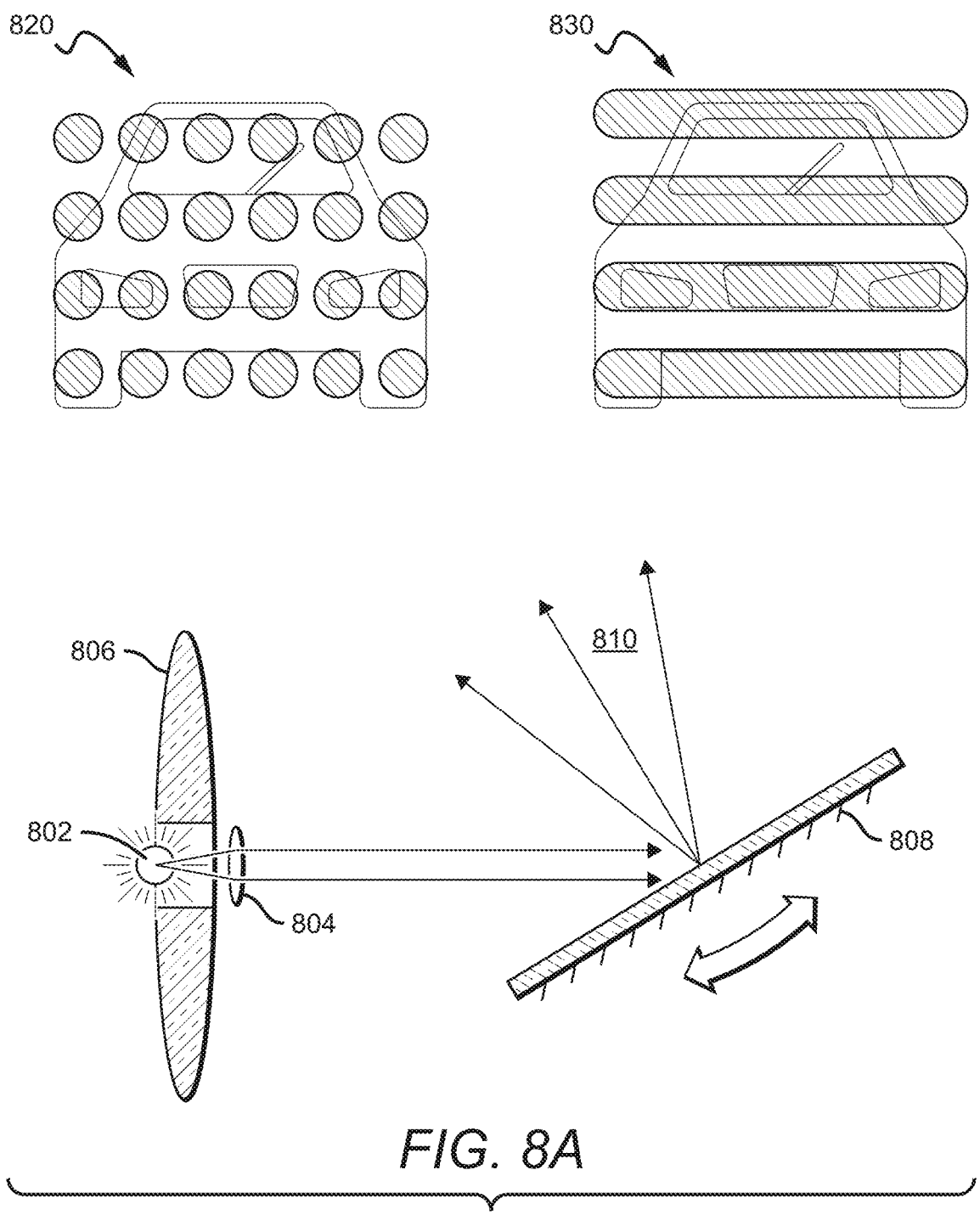
FIG. 8A illustrates examples of scanning schemes and transmitter configurations used for a multimodal detection system, according to various embodiments.

FIG. 8A illustrates examples of different scanning schemes and transmitter configurations used for a multimodal detection system 700. With reference to FIG. 8A, a light source 802 (e.g., a laser source) emits light (e.g., NIR, visible, SWIR, MWIR, LWIR) toward a steering mechanism 808 (e.g., one or more scanning optics such as polygon mirror and oscillation mirror) via transmission optics 804. The transmission optics 804 may include a lens, a lens array, mirrors, and/or fiber optics. In one embodiment, the transmission optics 804 is a collimation lens. The transmission light 810 is processed (e.g., collimated) by transmission optics 804 and scanned by steering mechanism 808 to the FoV (not shown in FIG. 8A).

FIG. 8A also illustrates a point scan scheme 820 and a line scan scheme 830. As described above, a steering mechanism (706 or 808) can be configured to perform point scanning and/or line scanning of the FoV. Point scan and line scan are two different techniques used in imaging and sensing applications. In point scan scheme 820, a steering mechanism can be configured to scan the FoV point-by-point to form a frame or image. Point scanning involves illuminating a small point or spot on the object of interest and detecting the reflected or transmitted light at that point. The detection can be done using a single photodetector or a small array of photodetectors. In point scanning, the scanning process is repeated for multiple points to create a complete frame or image of the object. Point scanning can be used to scan a small point on the object or FoV to create a high-resolution image or point cloud.

In contrast, line scanning involves illuminating a line or narrow strip on the object of interest and detecting the light intensity along that line. The detection can be done using a linear array of photodetectors. The line scanning process can be repeated for multiple lines to create a complete frame or image of the object or FoV. The main difference between point scanning and line scanning is the way they capture and process data. Point scanning captures information at a single point, while line scanning captures information along a line. Multimodal detection system 700 can be configured to select between point scanning and line scanning depending on the specific application and the desired level of detail and resolution needed.

With references to both FIGS. 7 and 8A, in some examples, for either point scanning or line scanning, the scanning may not be sequential. For example, the steering mechanism (e.g., 706 or 808) can be configured to scan some points in certain line or area, while skip scanning other points; or scan certain lines while skipping other lines. As another example, the steering mechanism of multimodal detection system 700 can be configured to scan certain points/lines in higher resolution while scan other points/lines in lower resolution. For instance, the high resolution scanning may be applied to regions of interest (ROIs) while the low resolution scanning or no scanning may be applied to other regions of the FoV. In some embodiments, to scan an ROI, the steering mechanism containing one or more optical or electrical scanners can be controlled to have different characteristics than those for scanning a non-ROI. For instance, for scanning the ROI, a scanner may be controlled to have slower scanning rate and/or a smaller scanning step, thereby increasing the scanning resolution. Furthermore, the light source 702 or 802 may also be configured to increase the pulse repetition rate, thereby increasing the scanning resolution.

With reference back to FIG. 7, in some embodiments, if a sensor in a multimodal detection system 700 does not require actively transmitting light and/or scanning the light, one or more of light source 702, transmitter 704, and steering mechanism 706 may not be required for that particular sensor. For example, if system 700 includes a passive video sensor (e.g., a camera), it may not require actively sending out light and/or scanning light to the FoV in order to forming an image of the FoV. The video sensor may just sense light from the FoV and used the sensed light to form an image. In some examples, the video sensor may require a light source (e.g., a flash light or other illuminations) to provide sufficient light conditions for sensing (e.g., capturing an image with enough brightness). In some examples, a video sensor can also perform a point scan or a line scan to obtain better performance such as an improved detection limit and a larger dynamic range. Such a video sensor may have a high image resolution and complex imaging structures and may thus be expensive. However, as described below, integrating such a video sensor with, for example, a LiDAR sensor in the multimodal detection system 700 can reduce the overall cost as compared to two discrete sensors.

FIG. 7 further illustrates that system 700 includes an optical receiver and light detector 730 to receive and detect light from FoV 770. As described above, the transmission side of system 700 may transmit light to FoV 770. A portion of the light transmitted may be reflected or scattered by objects in the FoV 770 to form return light signals. The return light signals may be received by optical receiver and light detector 730. In addition, optical receiver and light detector 730 may also receive light signals from other external light sources, including, for example, sunlight, ambient light, streetlight, and/or other sources of illuminations such as light from other LiDAR systems. The various light signals received by optical receiver and light detector 730 are collectively referred to as the received light signals or collected light signals. The received or collected light signals may include both return light signals formed based on transmitted light of system 700 and other light signals from other light sources. The received light signals may have a narrow or wide spectral range comprising, for example, one or more of visible light, NIR light, SWIR light, MWIR light, and/or LWIR light, etc. One or more of these received light signals can be detected by different types of light detectors (e.g., a LiDAR detector for detecting IR light signals, and a video sensor for detecting visible light signals). In the present disclosure, one or more of these light detectors can be integrated to form a hybrid detector. The light collection distribution device 710, signal separation device 740, and multimodal sensor 750 of optical receivers and light detector 730 will be described in greater detail below.

Figure 8B:
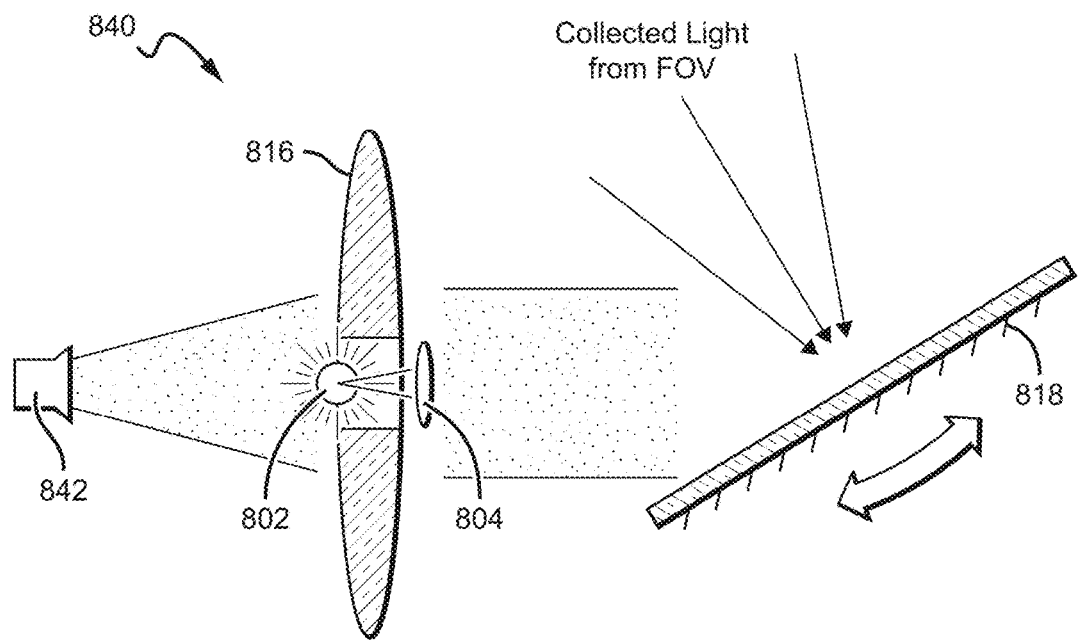
FIG. 8B illustrates a receiver configuration used for a single detector system.
Figure 8C:
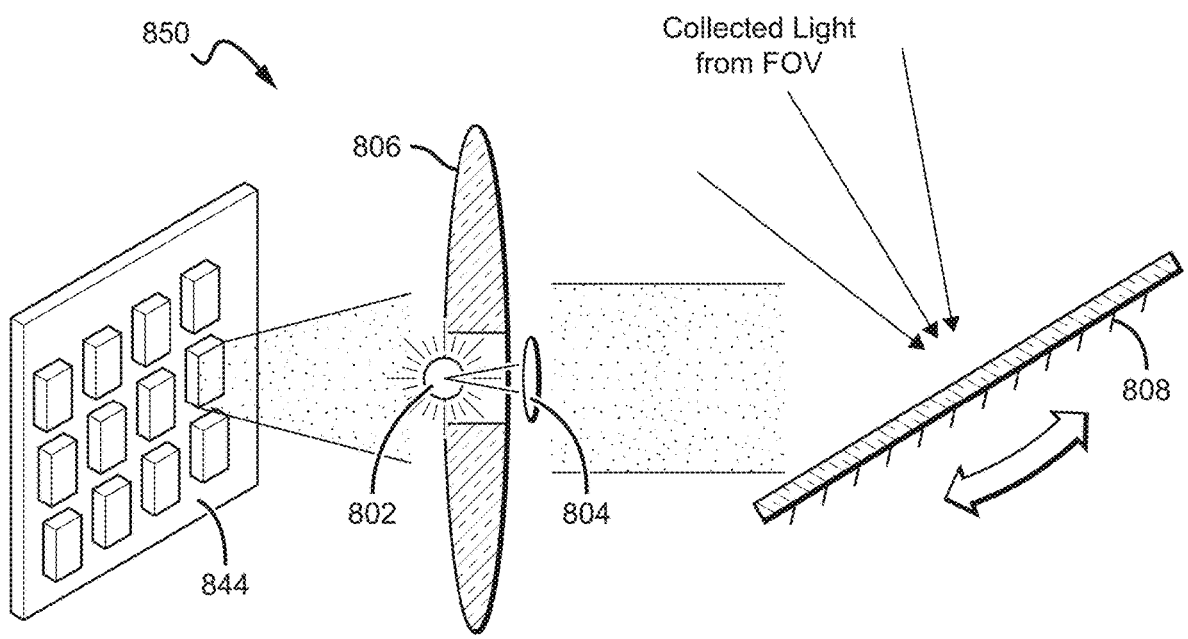
FIG. 8C illustrates a receiver configuration used for a multimodal detection system having integrated sensors, according to various embodiments.

Turning to FIGS. 8B and 8C, example receiver configurations used for a single detector system and a multimodal detection system are illustrated. As shown in FIGS. 8B and 8C, in a single detector system 840, the received light signals from the FoV can be directed by a steering mechanism 818 to receiver optics 816 (e.g., a collection lens or lens group).

Receiver optics 816 can be configured to collect, focus, and/or redirect the received light signals to detector 842. In some examples, detector 842 is configured to detect signals having a predetermined wavelength or wavelength range (e.g., the detector 842 may be a LiDAR detector configured to detect NIR light). Therefore, receiver optics 816 may include one or more filters (e.g., a bandpass filter) to filter out signals having other wavelengths (e.g., visible light, etc.).

FIG. 8C illustrates a receiver configuration 850 used for a multimodal detection system (e.g., system 700). In a multimodal detection system, the received light signals from the FoV can be directed by a steering mechanism 808 to receiver optics 806 (e.g., a collection lens or lens group). As described above, the received light signals may include light signals having multiple wavelength ranges. Receiver optics 806 can be configured to collect, focus, and/or redirect the received light signals to a multimodal sensor 844 comprising a plurality of integrated sensors. In some examples, multimodal sensor 844 can be configured to detect signals having a plurality of wavelengths or wavelength ranges. As illustrated in FIG. 8C, in some embodiments, multimodal sensor 844 may include one or more LiDAR sensors configured to detect NIR light, one or more imaging sensors configured to detect visible light, one or more thermal imaging sensors configured to detect infrared light (including, e.g., SWIR, MWIR, or LWIR), or the like.

A sensor of the multimodal sensor 844 can include one or more detectors. In some examples, the sensor may further include one or more optical elements (e.g., filter, lens) and/or one or more electrical elements (e.g., ADC). The one or more detectors in a sensor can be any type of detectors such as photodetectors (PDs), photoemission or photoelectric based detectors, semiconductor based detectors, active-pixel sensors, Cadmium-Zinc Telluride radiation detectors, charge-coupled devices (CCDs), complementary metal-oxide-semiconductor (CMOS) based images sensors, Mercury-Cadmium-Telluride (HgCdTe) based infrared detectors, Indium Antimonide (InSb) based detectors, light emitting diodes (LEDs), photoresistors, photodiodes, phototransistors, pinned photodiodes, quantum dot photoconductors/photodiodes, Silicon drift detectors, photovoltaic based detectors, avalanche photodiode (APD), thermal based detectors, Bolometers, microbolometers, cryogenic detectors, pyroelectric detectors, thermopiles, Golay cells, photoreceptor cells, chemical-based detectors, polarization-sensitive photodetectors, and/or graphene/silicon photodetectors.

As described below in greater detail, the plurality of sensors of multimodal sensor 844 can include multiple types of sensors integrated or mounted together to share, for example, a semiconductor wafer, a module, a printed circuit board, and/or a semiconductor package. As a result, the multimodal sensor 844 can have a compact dimension, thereby enabling the multimodal detection system to be also compact. A compact multimodal detection system can be disposed in or mounted to any locations within a moveable platform such as a motor vehicle. For instance, comparing to mounting multiple discreate sensors like one or more cameras, one or more LiDARs, one or more thermal imaging devices, one or more ultrasonic devices, etc., mounting a compact multimodal detection system can significantly reduce the complexity of integration of the multiple sensing capabilities into a vehicle, and/or also reduce the cost. As illustrated in FIGS. 7 and 8C, a multimodal detection system (e.g., system 700) that includes a multimodal sensor (e.g., sensor 750 or 844) is also sometimes referred to as a hybrid detection and ranging system (HyDAR).

Figure 9:
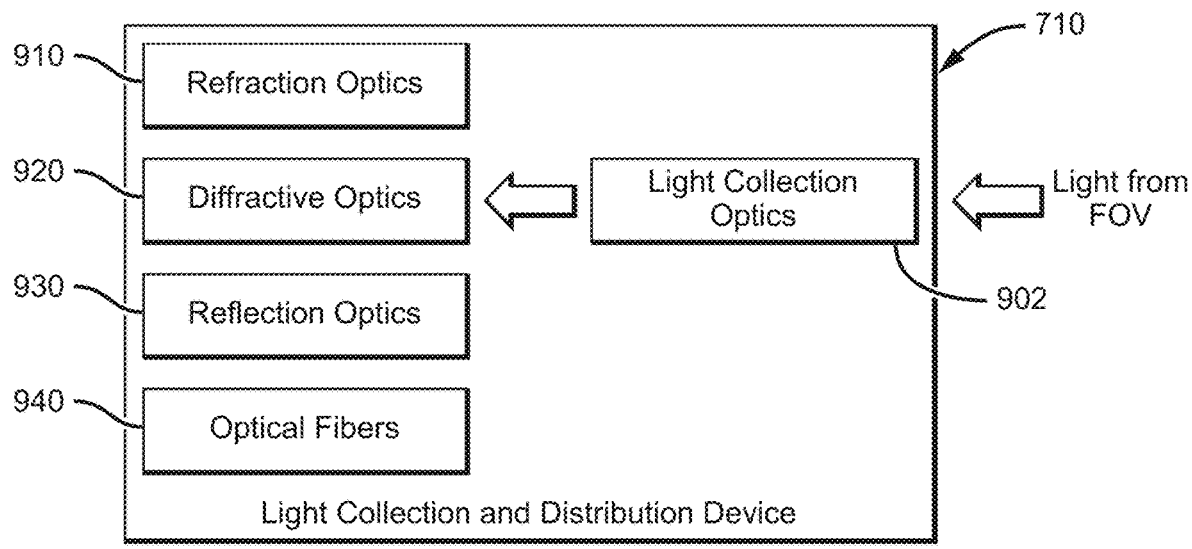
FIG. 9 illustrates an example light collection and distribution device, according to various embodiments.

Referring back to FIG. 7, in some embodiments, multimodal detection system 700 includes a light collection and distribution device 710. FIG. 9 illustrates such an example light collection and distribution device 710. Light collection and distribution device 710 can be configured to perform at least one of collecting light signals from a field-of-view (FOV) and distributing the light signals to a plurality of sensors of a multimodal sensor (e.g., sensor 844). The light signals collected and distributed by device 710 may have a plurality of wavelengths. At least one wavelength is different from one or more other wavelengths. As illustrated in FIG. 9, device 710 can include light collection optics 902, refraction optics 910, diffractive optics 920, reflection optics 930, and/or optical fibers 940. While FIG. 7 illustrates that steering mechanism 706 is a separate device from light collection and distribution device 710, in some embodiments, steering mechanism 706 may be integrated with, or a part of, device 710. For example, as described above in FIGS. 8A and 8C, steering mechanism 808 may be shared between the transmitter and the receiver for both transmitting light signals to the FoV and for receiving/redirecting light signals from the FoV. Thus, while FIG. 9 does not explicitly illustrate, light collection optics 902 may include a steering mechanism that is shared between the transmitter and receiver.

With reference to FIG. 9, light signals from the FoV can be received or collected by light collection optics 902 (e.g., by a steering mechanism 706). Light collection optics 902 include optics that are configured to collect and focus received light signals. Light collection optics 902 can be optimized to maximize the number of light signals collected from the FoV and direct the light signals toward a specific target, such as one of the refraction optics, diffractive optics, reflection optics, a detector, a sensor, and/or an imaging system. Light collection optics 902 may include one or more types of light collection optics, including one or more lenses, one or more lens groups, one or more mirrors, and one or more optical fibers. For instance, a collection lens or a lens group can be used to collect light signals from a distant object in the FoV and focus the light signals onto another optical components or a detector. Mirrors are another optical component that can be used in light collection optics 902. They can be used to reflect and redirect light toward a specific target. Mirrors can be used alone or in combination with lenses to form complex optical structures for collecting light signals.

In some embodiments as shown in FIG. 9, light collection optics 902 direct the collected light signals to one or more of refraction optics 910, diffractive optics 920, reflection optics 930, and/or optical fibers 940. In some embodiments, light collection optics 902 may be optional or integrated with refraction optics 910, diffractive optics 920, reflection optics 930, and/or optical fibers 940. For instance, the collected light signals can be directed (with or without light collection optics 902) to refraction optics 910. Refraction optics 910 can include optics that bend the light signals as they pass from one medium (e.g., air) to another medium (e.g., glass) with a different refractive index. A refractive index is a measure of how much a medium can bend light signals. When light signals pass from a medium with a high refractive index to a medium with a lower refractive index, the light signals bend away from the normal direction (e.g., the direction perpendicular to the surface at the point where the light enters the second medium). When the light passes from a medium with a low refractive index to a medium with a higher refractive index, the light bends toward the normal direction. The amount of bending depends on the angle of incidence (the angle between the incoming light signals and the normal direction) and the refractive indices of the two media. The relationship between these variables is described by the Snell's law, which states that the ratio of the sine of the angle of incidence to the sine of the angle of refraction is equal to the ratio of the refractive indices of the two media.

Figure 10:
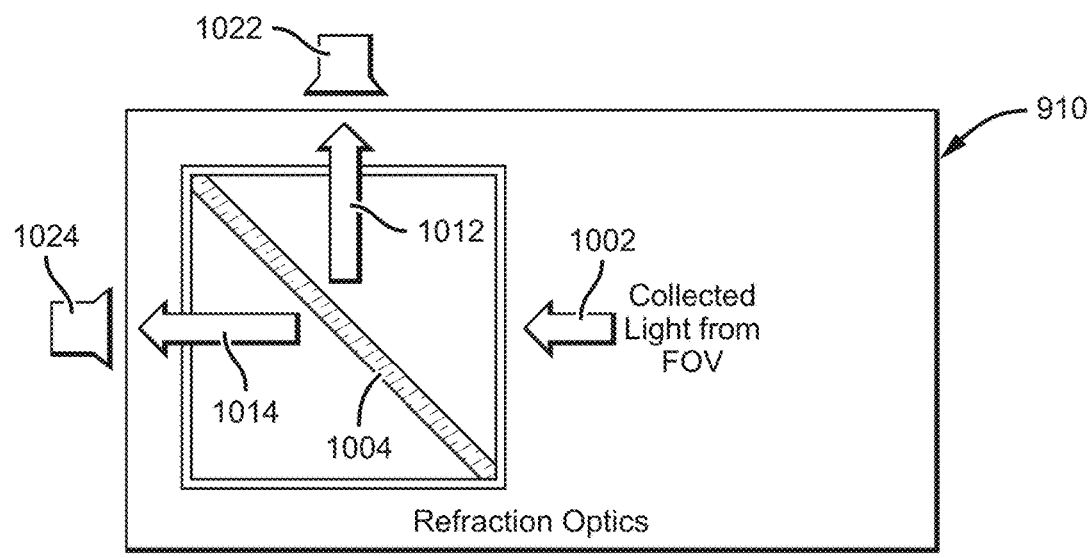
FIG. 10 illustrates example refraction optics, according to various embodiments of the present disclosure.

In some embodiments, refraction optics 910 can be implemented using a beam splitter 1004 shown in FIG. 10. As shown in FIG. 10, beam splitter 1004 can be configured to perform optical refraction such that it transmits a first portion 1014 of the incident light signals 1002 from the FoV (e.g., received directly or via light collection optics) to a first sensor 1024 and reflects a second portion 1012 of the received light signals 1002 to a second sensor 1022. The first sensor 1024 and second sensor 1022 can be different sensors located at two different positions. While the sensors 1022 and 1024 are shown to be located as having an approximately 90 degrees angle, it is understood that sensors 1022 and 1024 can be located at any other desired positions. Furthermore, beam splitter 1004 may direct light signals to additional sensors. In some examples, beam splitter 1004 comprises a plurality of prisms configured to separate the incident light signals having at least one of different wavelengths, different intensities, or different polarizations. For instance, beam splitter 1004 can be a non-polarizing beam splitter that splits the incident light signals without affecting the polarization state of the light signals. Rather, beam splitter 1004 can split the incident light signals 1002 to two or more portions having different directions and/or wavelengths and direct them to corresponding sensors. Beam splitter 1004 can also be a polarizing beam splitter that separates the incoming light signals to two portions having orthogonal polarizations such as horizontal and vertical polarizations.

In some embodiments, beam splitter 1004 can be configured with different splitting ratios, which determine the amount of light transmitted and reflected. For example, a 50/50 beam splitter divides the incident light signals 1002 into two portions having equal intensities, with one portion transmitted and the other portion reflected. The beam splitter 1004 may also have other splitting ratios such as 30/70 and 70/30, thereby providing different intensity separations. In some embodiments, beam splitter 1004 may also be a dichroic beam splitter, which is configured to split incident light signals based on the wavelengths. As a result, beam splitter 1004 can be used to direct light signals having different wavelengths to different types of detectors that are configured to detect light signals having different wavelengths.

With reference to FIG. 9, light collection and distribution device 710 may also include diffractive optics 920 configured to separate the incident light signals to portions having different wavelengths, intensities, or polarizations. Diffractive optics 920 may include optics having diffractive structures such as a diffractive gratings. Diffractive structures can be made of thin layers of materials that contain features, such as grooves, ridges, or other microstructures, that are configured to manipulate the phase of the incident light signals. These diffractive structures can be used to manipulate the properties of light signals, such as the direction, intensity, polarization, and wavelength. In some examples, diffractive optics 920 can include diffractive gratings, which is a periodic structure that separates light into its spectral components based on its wavelength. In some examples, diffractive optics 920 may also include diffractive lenses, beam splitters, and polarizers. Diffractive lenses can be configured to correct for chromatic aberration and other types of optical distortion, and can be used to provide lightweight and compact optical systems. Diffractive optics 920 can be used to create complex optical elements with a high degree of precision. As a result, they can be used in the multimodal detection system to precisely separate and direct light signals having different properties (e.g., wavelengths, intensities, polarizations, etc.) to different sensors.

Figure 11:
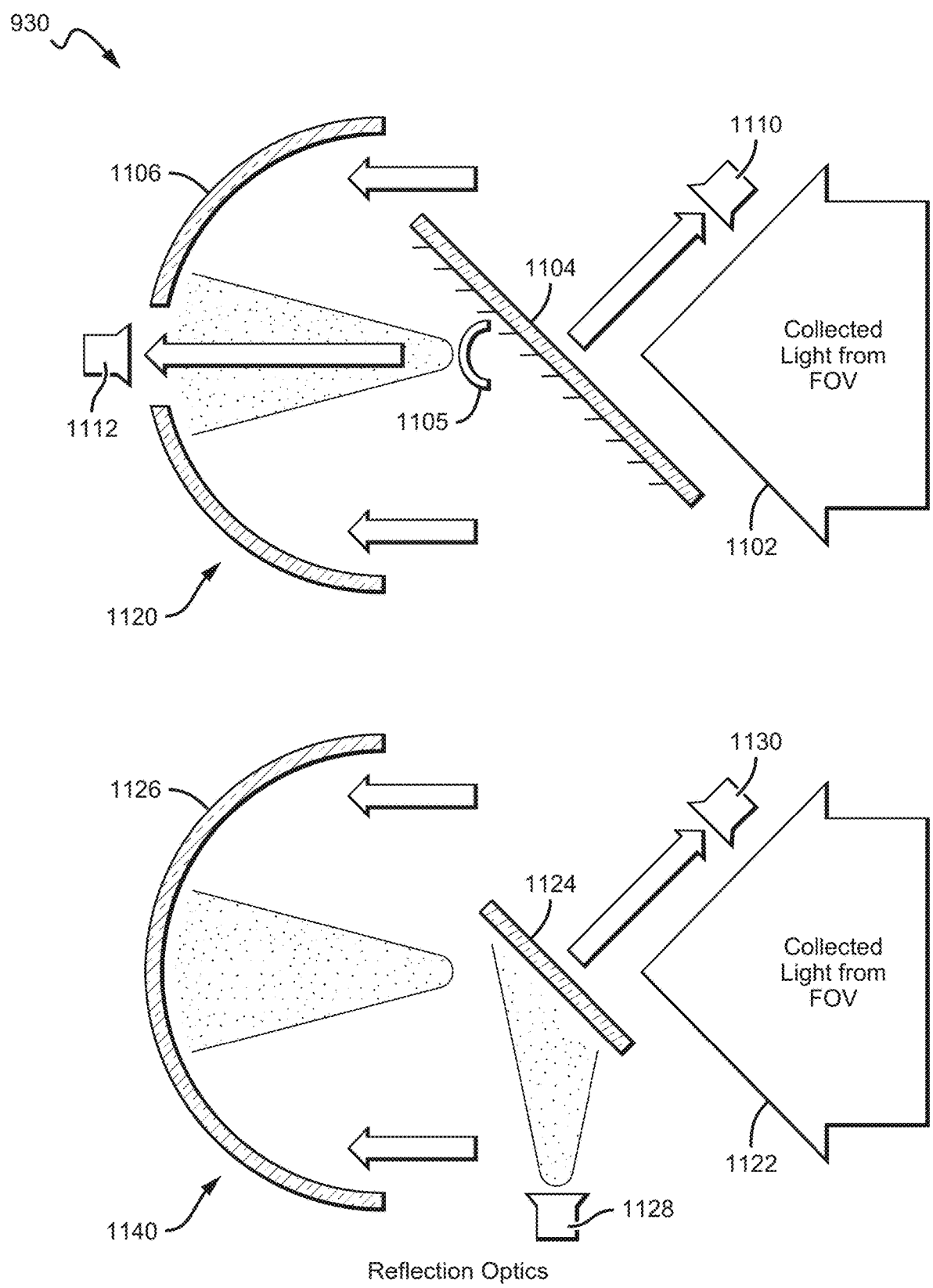
FIG. 11 illustrates example reflection optics, according to various embodiments of the present disclosure.

FIG. 9 also illustrates that light collection and distribution device 710 may include reflective optics 930. FIG. 11 illustrates examples of reflection optics 930, according to various embodiments of the present disclosure. Reflection optics 930 comprises one or more optical components that can reflect the incident light signals. The angle of incidence determines the angle of reflection. The properties of the surface of reflection optics, such as the roughness, shape, and material, can affect the reflection of the incident light signals. In one example as shown in FIG. 11, reflection optics comprises a Schmidt-Cassegrain based reflection device 1120 configured to direct a portion of the incident light signals 1102 to a first sensor 1110 and direct another portion of the incident light signals 1102 to a second sensor 1112. As shown in FIG. 11, device 1120 may include a combination of lenses and mirrors to fold the optical path such that the entire device is more compact. In particular, device 1120 can include a reflector (e.g., a mirror) 1104, a spherical primary mirror 1106, and a spherical secondary mirror and a corrector plate 1105. When in operation, reflector 1104 reflects a portion of incident light signals 1102 to first sensor 1110 (e.g., a LiDAR sensor that is configured to detect NIR signals). Reflector 1104 can be, for example, a mirror, a dichroic mirror (which reflects certain wavelengths), or polarizing beam splitter (which reflects one polarized light). Another portion of the incident light signals 1102 are reflected by spherical primary mirror 1106 to the spherical secondary mirror and corrector plate 1105. The spherical secondary mirror and corrector plate 1105 can include a convex mirror acting as a field flattener that redirects the light signals to a second sensor 1112 through an opening in the spherical primary mirror 1106. The type of the second sensor 1112 can be the same or different from the first sensor 1110. For instance, the second sensor 1112 may include an imaging sensor for capturing visible light signals as a camera. The spherical secondary mirror and corrector plate 1105 can also include a corrector plate, which is made of a thin piece of glass or other transparent material, that can correct for the spherical aberration introduced by the spherical mirrors. In this manner, device 1120 can be a compact device that distribute the incident light signals to different sensors located at different spatial positions. Therefore, device 1120 can be used to perform spatial distribution of the incident light signals 1102.

In some examples, reflection optics 930 includes a Newtonian-based reflection device 1140 configured to direct a portion of the incident light signals 1122 to a first sensor 1130 and direct another portion of the incident light signals to a second sensor 1128. In particular, Newtonian-based reflection device 1140 includes a primary reflector 1126 and a flat diagonal reflector 1124. The primary reflector 1126 can be a spherical mirror (e.g., a concave mirror) configured to collect and focus a portion of incident light signals 1122. The primary reflector 1126 focuses a portion of incident light signals 1122 to the flat diagonal reflector 1124, which reflects the portion of the light signals out of the side of the device 1140 and into second sensor 1128. Another portion of incident light signals 1122 can be reflected directly by reflector 1124 to the first sensor 1130. Reflector 1124 can be, for example, a mirror, a dichroic mirror (which reflects certain wavelengths), or polarizing beam splitter (which reflects one polarized light). Similar to described above, the type of sensors 1128 and 1130 can be the same or different (e.g., one for LiDAR sensing of NIR light and one for camera imaging of visible light). Thus, in some examples, the two sides or facets of reflector 1124 can be configured to reflect of light signals having different wavelengths. For instance, one side of reflector 1124 can be coated with materials that reflects entire or a substantial portion of visible light signals toward first sensor 1130, while the other side of reflector 1124 can be coated to reflect entire or a substantial portion of NIR light signals toward second sensor 1128. As a result, the Newtonian-based reflection device 1140 can be configured to perform one or both of spatial distribution and wavelength separation of the incident light signals.

In some embodiments, the primary mirror 1126 in a Newtonian-based reflection device 1140 is a concave parabolic mirror that is typically made of glass or other reflective material. The curvature of the mirror is configured to focus the incident light signals onto a focal point at the center of the primary mirror 1126. Therefore, mirror 1124 can be positioned at the center or the focal point of mirror 1126 to receive the light signals from mirror 1126. In some embodiments, mirror 1124 is a flat diagonal mirror that is placed at a 45-degree angle with respect to the direction of the incident light signals 1122 or second sensor 1128. One of the advantages of the Newtonian-based reflection device 1140 is its simple configuration and low cost compared to other types of light distribution devices, such as refraction-based distribution devices. It is also relatively compact and easy to be integrated to, or mounted to, a moveable platform such as a motor vehicle. Additionally, because the primary mirror 1126 is located at the open end of the device 1140, it can be easily cleaned and maintained.

Figure 12:
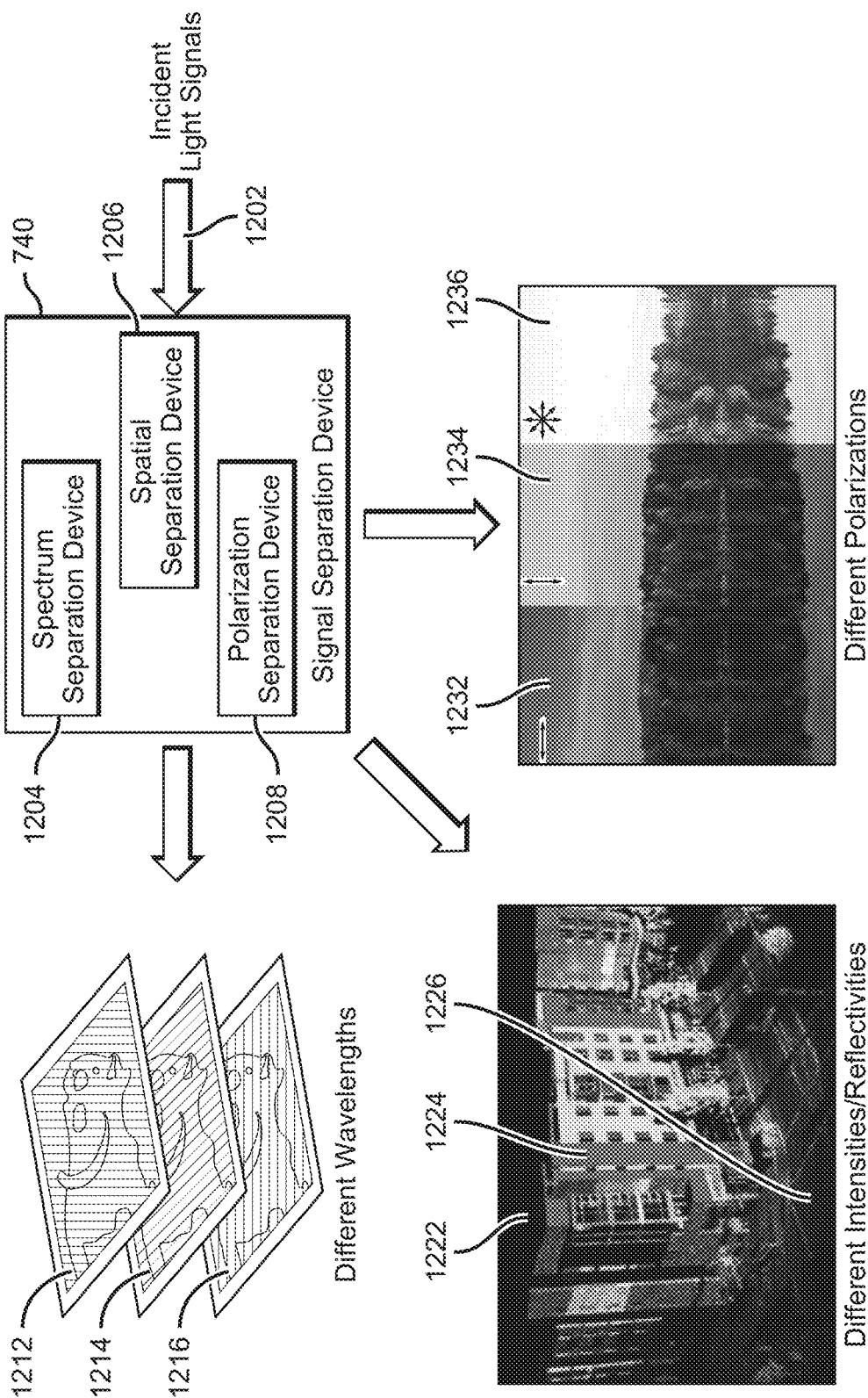
FIG. 12 illustrates an example signal separation device, according to various embodiments of the present disclosure.

As described above and shown in FIG. 7, multimodal detection system 700 may include a signal separation device 740. FIG. 12 illustrates an example of such signal separation device 740. Signal separation device 740 is configured to separate the incident light signals to form separated light signals having a plurality of different light characteristics. The signal separation device 740 can perform a variety of separations including spatial separation, intensity separation, spectrum separation, polarization separation, etc. While FIG. 7 illustrates that signal separation device 740 and light collection and distribution device 710 are two different devices, in some embodiments, signal separation device 740 may be at least partially combined with light collection and distribution device 710. For instance, as described above, light collection and distribution device 710 can include one or more of refraction optics, diffractive optics, reflection optics, etc., to perform spatial distribution of the incident light signals. Thus, these optical components may form a part of the signal separation device 740 (e.g., as spatial separation device 1206) to separate incident light signals to different portions and direct the different portions to different detectors at different physical locations.

With reference to FIG. 12, signal separation device 740 may include a spatial separation device 1206, a spectrum separation device 1204, a polarization separation device 1208, and/or other separation devices (not shown). Spatial separation device 1206 is configured to separate light signals to form separated light signals corresponding to at least one of different spatial positions of the plurality of sensors or different angular directions of the light signals. Thus, the light signals from spatial separation device 1206 can have different physical locations and/or different angular directions. The spectrum separation device 1204 is configured to separate the light signals to form the separated light signals having different wavelengths (e.g., NIR light, visible light, SWIR light, etc.). The polarization separation device 1208 is configured to separate the light signals to form the separated light signals having different polarizations (e.g., horizontal or vertical).

The devices included in signal separation device 740 can be configured and structured in any desired manner. In one embodiment, spatial separation device 1206 may be disposed upstream to receive the incident light signals 1202 and to direct the spatially separated light signals to spectrum separation device 1204 and/or polarization separation device 1208. In another embodiment, spectrum separation device 1204 may be disposed upstream to receive the incident light signals 1202 and to direct the spectrally separated light signals to spatial separation device 1206 and/or polarization separation device 1208. Similarly, polarization separation device 1206 can be disposed upstream. In other words, signal separation device 740 can be configured such that the spectrum separation, spatial separation, polarization separation, and/or any other separations can be performed in any desired order. In other embodiments, two or more types of separations can be performed together. For example, as described above, a prism or a beam splitter may separate light signals both spectrally and spatially. Each of the devices 1204, 1206, and 1208 is described in greater detail below.

Figure 13:
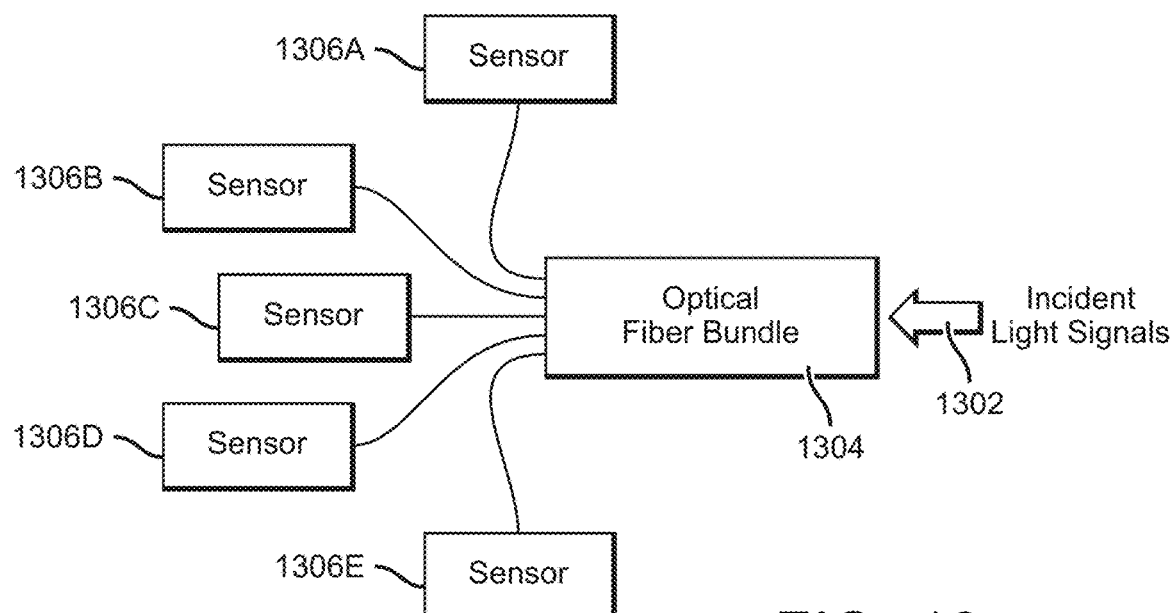
FIG. 13 illustrates an example distribution of light to a plurality of detectors using optical fibers, according to various embodiments of the present disclosure.

One example of a spatial separation device 1206 is a fiber bundle 1304 illustrated in FIG. 13. FIG. 13 illustrates an example distribution of incident light signals 1302 to a plurality of sensors 1306A-1306E using optical fibers, according to various embodiments of the present disclosure. As illustrated in FIG. 13, incident light signals 1302 are coupled to optical fiber bundle 1304, which may include many optical fibers bundled together such that they are physically located close to each other at one end of the fiber bundle 1304. Different optical fibers of the fiber bundle 1304 can then be routed to different sensors 1306A-1306E located at different physical locations. The locations of sensors 1306A-1306E are for illustration purposes. Sensors 1306A-1306E may be located further apart or located relative close to each other. As described above, in some embodiments, a plurality of sensors may be integrated in one semiconductor wafer, module, or package. A plurality of sensors may also be placed in different semiconductor wafers, modules, or packages. Regardless of where the sensors are located, using optical fibers provides the flexibility of placing the sensors in any desired locations.

The one or more optical fibers shown in FIG. 13 can be configured as single-mode fibers, multimode fibers, plastic optical fiber (POF), polarization-maintain fiber, and/or any other kind of fibers. The one or more optical fibers of the fiber bundle 1304 can be configured to have desired dimensions (e.g., core sizes), materials, and structures. For example, if an optical fiber in fiber bundle 1304 is configured as a single mode fiber, it may have a small core diameter, typically less than 10 microns, and is designed to carry a single mode of light. A single-mode fiber can be used for carrying light signals over a long distance because it has low signal attenuation and high bandwidth. Thus, if a sensor is located far away from where the fiber bundle 1304 receives the incident light signals, a single-mode fiber can be used. This may occur, for example, where a LiDAR scanner/ receiver and light detector are separately located at two different locations in a vehicle, and are relative far from each other (e.g., scanner/receiver is located at the front side of the car, while the detector is located somewhere inside the vehicle or at the backside of the vehicle).

As another example, if an optical fiber is configured as a multimode fiber, it may have a larger core diameter, typically between 50 and 62.5 microns, and is designed to carry multiple modes of light. A multimode fiber can be used to carry light signals over a shorter distance. Thus, if a sensor is located close to where the fiber bundle 1304 receives the incident light signals, a multimode fiber can be used. As another example, an optical fiber in fiber bundle 1304 may be configured as a plastic optical fiber, which is a type of optical fiber made from plastic rather than glass. It has a larger core diameter than traditional glass fibers, making it easier to work with and less expensive. POF can be used for carrying light signals over a short range. POF fibers can provide improved flexibility and durability.

As another example, an optical fiber in fiber bundle 1304 may be configured as polarization-maintaining fiber, which is structured to maintain the polarization of the light signal as it travels through the fiber. As described above, different polarization may provide different levels of information, and thus may be useful for sensing and perception. Thus, a polarization-maintaining fiber can be used if polarization precision needs to be maintained. As another example, an optical fiber in fiber bundle 1304 may be configured as a bend-insensitive fiber, which is structured to reduce signal loss when the fiber is bent or twisted. It can be used in applications where the fiber may need to be routed around corners or through tight spaces (e.g., through a vehicle internal spaces). It is understood that optical fibers of fiber bundle 1304 can be configured to have any desired type, structure, materials, and size. For instance, they can be hollow core fibers, photonic crystal fibers, and fiber Bragg gratings.

In some embodiments, optical fibers in fiber bundle 1304 can be configured such that different fibers receive light signals having different light characteristics. For instance, the optical fiber that couples to sensor 1306A may receive light signals having a first wavelength, the optical fiber that couples to sensor 1306B may receive light signals having a second wavelength, and so forth. As another example, the optical fiber that couples to sensor 1306A may receive light signals having a first angular direction, the optical fiber that couples to sensor 1306B may receive light signals having a second angular direction, and so forth. In this manner, incident light signals having different angle of incidences, which may correspond to different transmission channels, can be received by different optical fibers and directed to their corresponding detectors.

Alternatively or additionally, some or all optical fibers of the optical fiber bundle 1304 may receive light signals having the same light characteristics. And thus, each of these optical fibers carries a portion of the light signals having the same light characteristics (e.g., same light wavelength). At the end of the optical fiber that is close to the sensor, one or more other optical devices such as a filter may be coupled to the optical fiber, thereby passing some light signals to a particular sensor, while filtering out other light signals. For example, light signals having the same polarization may be carried by both optical fibers that carry the light signals toward sensors 1306C and 1306D. At the end of optical fiber that carries the light signals toward sensor 1306C, a polarization filter may be disposed such that only light signals having horizontal polarization can pass to sensor 1306C. Similarly, another polarization filter may be disposed in front of sensor 1306D, such that only light signals having vertical polarization can pass to sensor 1306D. As a result, the light signals are separated by their characteristics after they are carried by the optical fibers but before they are received by the sensors.

Figure 14:
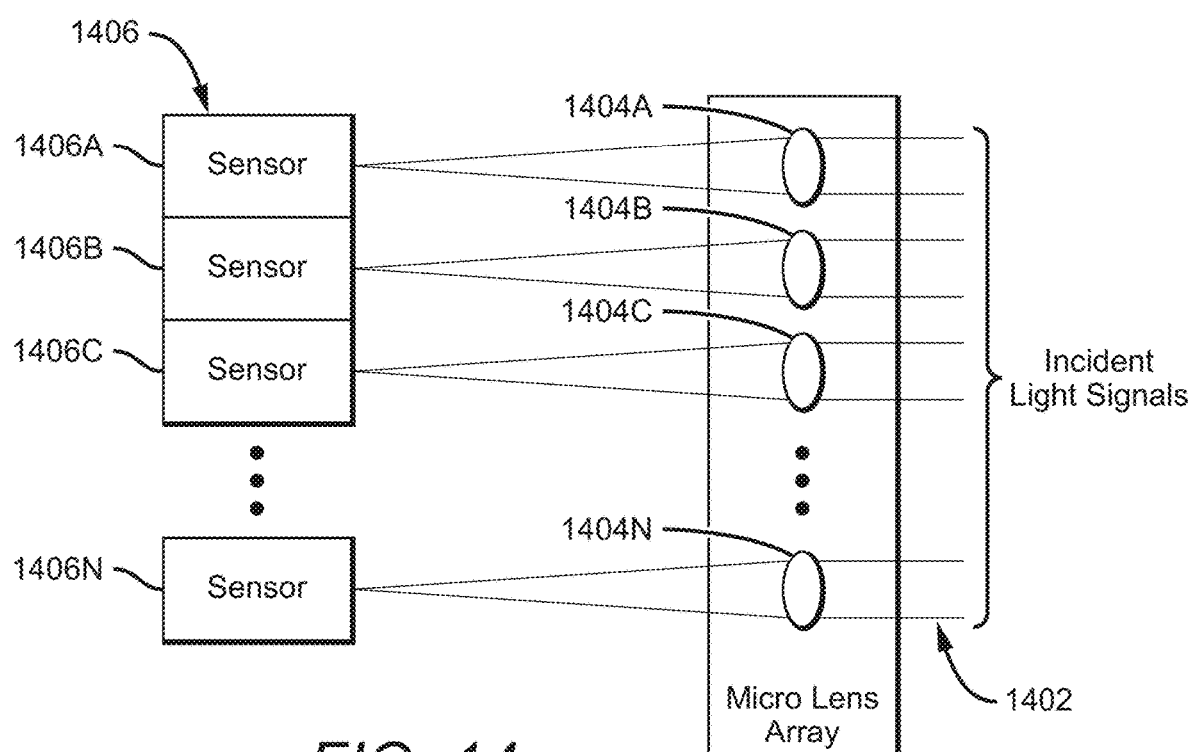
FIG. 14 illustrates an example distribution of light to a plurality of detectors using a micro lens array, according to various embodiments of the present disclosure.

Another example of a spatial separation device 1206 shown in FIG. 12 comprises a micro lens array. FIG. 14 illustrates an example distribution of light signals to a plurality of sensors using a micro lens array 1404, according to various embodiments of the present disclosure. As illustrated in FIG. 14, spatial separation device 1206 comprises a micro lens array 1404 configured to separate the incident light signals to form the separated light signals and direct the separated light signals to respective sensors. Micro lens array 1404 is an optical component comprising an array of small lenses 1404A-1404N. These small lenses typically have diameters ranging from tens to hundreds of micrometers. Each lens in the micro lens array 1404 focuses light signals onto a specific point or a sensor 1406A-1406N, and the overall effect of the array is to shape or manipulate the light signals in a particular way. FIG. 14 only illustrates one example of the placement of the micro lenses. It is understood that the micro lenses can be disposed in any desired manner (e.g., at an angle with one another, forming a 1D, 2D, or 3D array, forming a shape corresponding to the positions of the sensors) to direct each portion of the incident light signals 1402 to its corresponding sensor. Micro lens array 1404 can be used to enhance the resolution and sensitivity of imaging systems by focusing light signals onto a detector array or improving light collection efficiency. Micro lens array 1404 can also be used to shape light into specific patterns or distributions for use in applications such as image sensing or depth sensing. Micro lens array 1404 can also be used to couple light between optical fibers or to improve the coupling efficiency between optical components. Micro lens array 1404 can be made from materials such as glass, silicon, or plastic, and can be customized in terms of lens size, shape, and spacing to achieve the desired optical performance.

With reference back to FIG. 12, signal separation device 740 may also include a spectrum separation device 1204, which is configured to separate light signals to form the separated light signals having different wavelengths or colors. Spectrum separation device 1204 comprises one or more of a Dichroic mirror, a dual-band mirror, a dual-wave length mirror, a Dichroic reflector, an red-green-blue (RGB) filter, an infrared light filter, a colored glass filter, an interference filter, a diffractive optics, a prism, diffraction gratings, blazed gratings, holographic gratings, and a Cezrny-Turner monochromator. For example, a prism can refract light signals at different angles depending on the wavelength of the light signals. Using the visible light as an example, when a beam of incident light signals is passed through a prism, the light signals may be separated to different colors for different channels including a red channel 1212, a green channel 1214, and a blue channel 1216. As another example, diffraction gratings can also be used for spectrum separation. They include a series of closely spaced parallel lines or slits that diffract light at different angles depending on the wavelength of the light. Using diffraction gratings, incident light signals can similarly be separated into a red channel 1212, a green channel 1214, and a blue channel 1216. The separated light signals have different wavelengths, which may carry different information that can be more easily processed by a computer vision algorithm.

FIG. 12 also illustrates that signal separation device 740 can include a polarization separation device 1208, which is configured to separate light signals to form the separated light signals having different polarizations. In one embodiment, the polarization separation device 1208 comprises one or more of absorptive polarizers including crystal-based polarizers, beam-splitting polarizers, Fresnel reflection based polarizers, Birefringent polarizers, thin film based polarizers, wire-grid polarizers, and circular polarizers. For instance, polarization separation can be achieved using polarizing filters, which are optical filters that only transmit light waves with a specific polarization orientation. Polarizing filters can be made from materials such as polarizing films, wire grids, or birefringent crystals. When unpolarized light is passed through a polarizing filter, only the component of the light with the same polarization orientation as the filter is transmitted, while the other polarization component is blocked. This results in polarized light with a specific polarization orientation. FIG. 12 illustrates that when light signals pass through the polarization separation device 1208, the light signals can be separated to light signals having horizontal polarization 1232, light signals having vertical polarization 1234, and light signals having all polarizations 1236. Image data formed by light signals having different polarizations can include different information such as different contrast, brightness, color, etc.

FIG. 12 also illustrates that using one or more of the above types of separation devices and other types of separation/processing devices (e.g., an image sensor such as a CCD array), signal separation device 740 can process the incident light signals to differentiate light intensities and/or reflectivity. As shown in FIG. 12, light signals reflected or received at different angles by an optical receiver may have different light intensities. The different light intensities may be sensed and represented by signal separation device 740 by, for example, different brightness/color of the image captured. For instance, FIG. 12 illustrates that in area 1222, the transmission light signals from a LiDAR device does not have any reflected light (e.g., because the area 1222 represents the sky). As a result, area 1222 can be represented by black color or marked as a dark area. In addition, different materials or objects may have different reflectivity. The different reflectivity can also be represented by different color. For instance, area 1224 is represented by the red color and area 1226 is represented by the blue color, indicating that the object in area 1224 has a high reflectivity than the object in area 1226.

Figure 15:
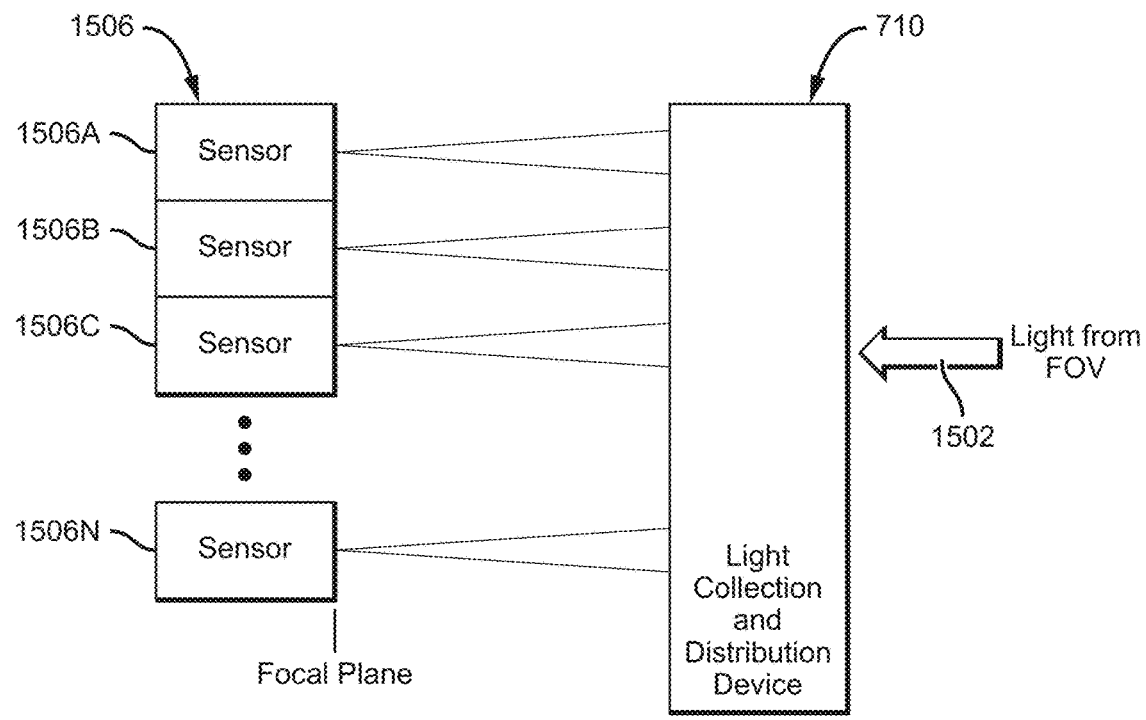
FIG. 15 illustrates an example distribution of light without using a signal separation device, according to various embodiments of the present disclosure.

With reference back to FIG. 7, as described above, in some embodiments, light collection and distribution device 710 and signal separation device 740 may be two separate devices. For example, device 710 is configured to collect light signals from the FoV 770 and spatially distribute the received light signals, while device 740 is configured to spectrally separate the received light signals. In some embodiments, light collection and distribution device 710 and signal separation device 740 may be combined together to perform one of more of spatial separation, spectrum separation, polarization separation, etc. In another embodiment, light collection and distribution device 710 can directly distribute the light signals to multimodal sensor 750 without using a signal separation device 740. FIG. 15 illustrates an example distribution of light signals without using a signal separation device. As shown in FIG. 15, in this embodiment, light collection and distribution device 710 can include one or more of lens, lens groups, mirrors, gratings, optical fibers, and other refraction, diffractive, and reflection optics. The light signals 1502 are collected by device 710 from the FoV and focused directly onto the sensor array 1506 without using a signal separation device. The sensor array 1506 includes a plurality of sensors 1506A-1506N. Each sensor may include one or more detectors. In FIG. 15, it is shown that the sensors 1506A-1506N forms a 1D array and that the focal plane for all light signals passing through device 710 is aligned such that the light signals are correctly focused onto the sensors 1506A-1506N. It is understood that the focal planes may vary for different light signals passing device 710. Thus, sensors 1506A-1506N may not form a 1D array as illustrated in FIG. 15. They could be placed at any positions such that the corresponding light signals can be focused properly onto the sensors. For instance, sensors 1506A-1506N may form a 2D array, a 3D array, a circular pattern, or any other pattern configured to properly receive the light signals.

Figure 16:
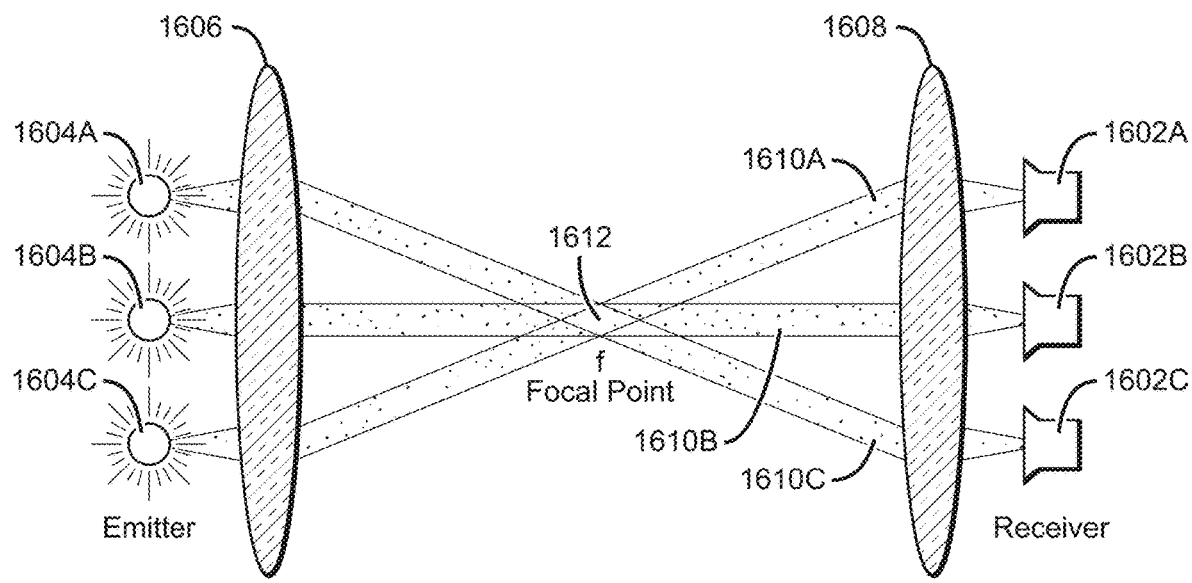
FIG. 16 illustrates an example spatial configuration of an array of light emitting elements and a corresponding array of detector elements, according to various embodiments of the present disclosure.

With reference back to FIG. 7, when received light signals are processed by light collection and distribution device 710 and optionally signal separation device 740, they are passed onto multimodal sensor 750. In some embodiments, multimodal sensor 750 includes a plurality of sensors that are positioned corresponding to the respective light emitters to improve the light collection effectiveness. Each sensor may include one or more detectors. FIG. 16 illustrates an example spatial configuration of an array of light emitting elements 1604A-1604C and a corresponding array of sensors 1602A-1602C, according to various embodiments of the present disclosure. As shown in FIG. 16, a light source may include a plurality of light emitters 1604A-1604C. The light emitters may be placed in an array (e.g., 1D, 2D, 3D arrays) and may be spaced apart for a non-zero pitch. FIG. 16 also illustrates that a lens 1606 is disposed in front of the light emitters 1604A-1604N. The lens 1606 may be, for example, a collimation lens configured to collimate the light signals from each of the emitters 1604A-1604C to form a collimated light beam. When the light signals pass lens 1606, each collimated light beam may have a different angle (due to the orientation of the light emitters 1604A-1604C, or due to the non-zero pitch between the light emitters 1604A-1604C). In some examples, as shown in FIG. 16, these light beams from the different light emitters may converge such that they cross each other at a focal point. In some other examples, they may diverge so that they do not cross a focal point.

To receive the light signals originated from light emitters 1604A-1604C, a collection lens 1608 and a sensor array are used. The collection lens 1608 collects light signals and direct them to the sensor array. The sensor array including sensors 1602A-1602C. Each of the sensors 1602A-1602C are positioned and/or oriented corresponding to one of the light emitters 1604A-1604C. In one embodiment, each of the sensors 1602A-1602C includes a detector. As shown in FIG. 16, light signals originated from light emitters 1604A, 1604B, and 1604C can be received by sensors 1602C, 1602B, and 1602A, respectively. In one example, light signals originated from light emitters 1604A, 1604B, and 1604C are reference signals for a LiDAR device. With the configuration of FIG. 16, the reference signals can be properly received by their corresponding sensors. While FIG. 16 illustrates a configuration where the light signals originated from emitters 1604A, 1604B, and 1604C are received directly by sensors 1602C, 1602B, and 1602A, respectively, it is understood that other optic components may be placed between the emitters and the detectors. Furthermore, the positions and orientations of the sensors 1602A-1602C can be configured to receive light signals from an FoV, rather than directly from the light emitters. For instance, for a LiDAR device, light emitters 1604A-1604C can emit light signals for different transmitter channels. The light signals in each transmitter channel may form a light beam having a particular angular direction. When the transmission light signals of a particular transmitter channel are reflected by an object in the FoV, the return light signals may have a particular angular direction as well. Each of the sensors 1602A-1602C can thus be positioned accordingly to receive return light signals formed from the transmission light signals of a corresponding transmitter channel. This configuration can thus improve the detection efficiency of the sensors.

With reference back to FIG. 7, as described above, multimodal sensor 750 can include the plurality of sensors. The plurality of sensors may have different types. For instance, the plurality of sensors may comprise at least a light sensor of a first type and a light sensor of a second type. The light sensor of the first type can be configured to detect light signals having a first light characteristic, where the light sensor of the second type is configured to detect light signals having a second light characteristic. The first light characteristic can be different from the second light characteristic. For instance, the light sensor of the first type can include a detector configured to detect light signals having an NIR wavelength for a LiDAR device. The light sensor of the second type can include a detector configured to detect light signals having the visible light wavelength for a camera. As described above, the NIR wavelength signals can be used by a LiDAR device to perform distance measurements.

Figure 17:
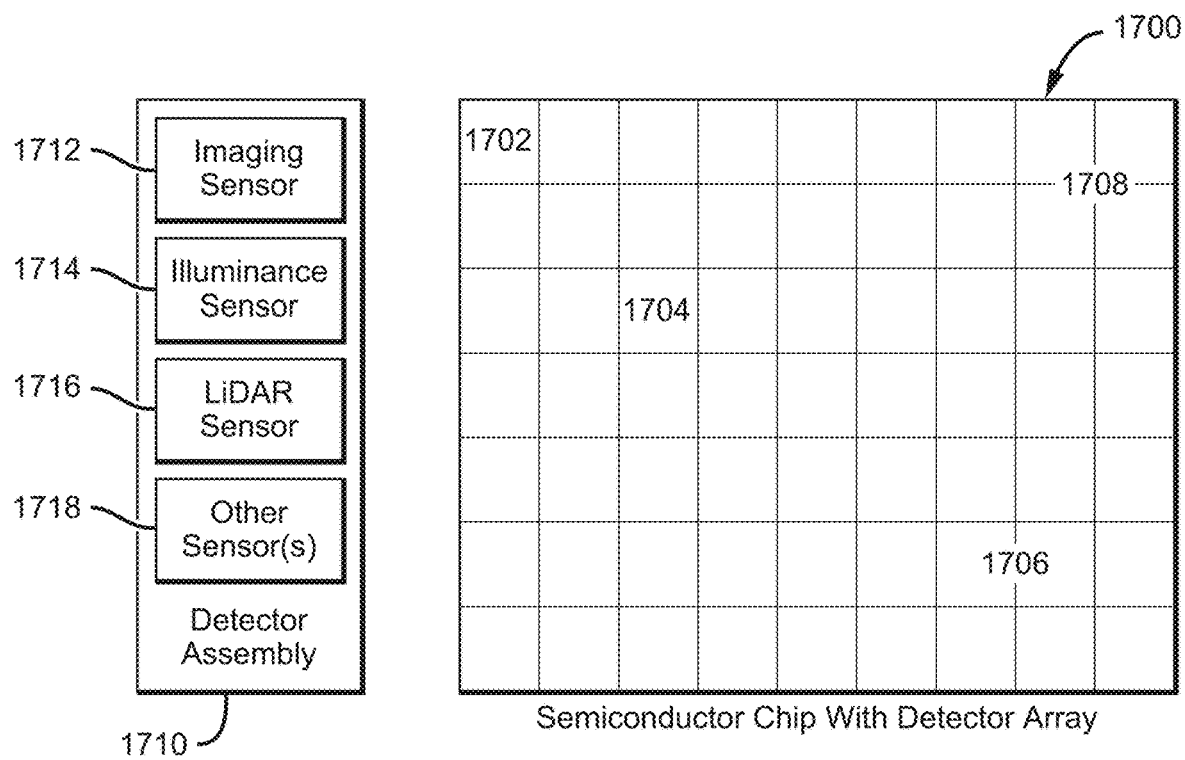
FIG. 17 illustrates example configurations of integrated sensors, according to various embodiments of the present disclosure.

In some embodiments, the plurality of sensors of multimodal sensor 750 can be combined or integrated together. FIG. 17 illustrates example configurations of integrated detectors of a multimodal sensor 750, according to various embodiments of the present disclosure. As shown in FIG. 17, two or more sensors of a multimodal sensor can be integrated in a single device package, detector assembly, a semiconductor chip, or a single printed circuit board (PCB). For instance, a semiconductor chip 1700 may include many dies sharing a semiconductor substrate. The dies can be located in the same wafer. At least a part of semiconductor chip 1700 may be used as sensors for a multimodal sensor 750. In the embodiment shown in FIG. 17, chip 1700 may include four sensors 1702, 1704, 1706, and 1708. Sensors 1702 and 1704 may be disposed in a respective die of chip 1700 (one die in chip 1700 is illustrated as a small square). Sensors 1706 and 1708 may be disposed in multiple dies. For example, sensor 1706 may include 4 detectors that are disposed across 4 dies horizontally, while sensor 1708 may include 4 detectors that are disposed across 4 dies both horizontally and vertically forming a 2×2 array. It is understood that a sensor can be disposed in any desired manner across any number dies. The chip 1700 may also include other sensors or circuits. For instance, readout circuits for processing the sensor generated signals can be integrated in chip 1700, thereby improving the degree of integration of multimodal sensor 750 and reducing cost.

Sensors that can be integrated in chip 1700 may include photodiode-based detectors, avalanche photodiodes (APDs) based detectors, charge-coupled devices (CCDs) based detectors, etc. For example, photodiodes based detectors may be made from Silicon or Germanium materials; APD-based detectors may be made from Silicon, Germanium, Indium Gallium Arsenide (InGaAs), Mercury Cadmium Telluride (MCT); and CCD-based detectors can be made from Silicon, Gallium Arsenide (GaAs), Indium Phosphide (InP), and MCT. In some examples, APDs can be used for sensing infrared light for a LiDAR device, and CCD can be used for sensing visible light for a camera. Therefore, multiple sensors can be integrated together on chip 1700 by using semiconductor chip fabrication techniques. It is understood that a sensor included in multimodal sensor 750 can also use other suitable semiconductor materials such as Silicon Germanium (SiGe).

With continued reference to FIG. 17, in some embodiments, chip 1700 may also integrate a photonic crystal structure, which is a type of artificial periodic structure that can manipulate the flow of light in a similar way to how crystals manipulate the flow of electrons in solid-state materials. Photonic crystals are made by creating a pattern of periodic variations in the refractive index of a material. This pattern creates a photonic band gap, which is a range of frequencies of light that cannot propagate through the material. The photonic band gap arises from the interference of waves reflected by the periodic structure, leading to destructive interference at certain frequencies and constructive interference at others. The result is a range of frequencies where light cannot propagate, similar to how electronic band gaps prevent the flow of electrons in semiconductors. Photonic crystals can be made from a variety of materials, including semiconductors, metals, and polymers. A photonic crystal structure can be used to implement optical filters, detectors, waveguides, and laser emitters. For instance, the photonic band gap can be used to create optical filters; and the sensitivity of photonic crystals to changes in refractive index can be used to create highly sensitive sensors. Therefore, by using photonic crystal structure, chip 1700 can integrate not only sensors or detectors, but also other optical components such as filters, waveguides, and light sources, thereby further improving the degree of integration. Various dies or modules disposed in chip 1700 can thus implement different functions. Chip 1700 can be bonded to other components (e.g., a readout circuitry, a PCB) using wire bonding, flip-chip bonding, BGA bonding, or any other suitable packaging techniques.

As described above, a multimodal sensor 750 may include multiple sensors. A sensor includes one or more detectors, one or more other optical elements (e.g., lens, filter, etc.) and/or electrical elements (e.g., ADC, DAC, processors, etc.). In the example shown in FIG. 17, multiple sensors can be integrated or disposed in one detector assembly 1710. The detector assembly 1710 may be a device package, a device module, or a PCB. The multiple sensors are mounted to the same device package, device module, or PCB. In other embodiments, the detector assembly may include two or more device packages, two or more modules, or two or more PCBs. Each of the multiple sensors may be mounted to a different device package, device module, or PCB. The different device packages, modules, or PCBs may be disposed close to each other or in a housing to form an integrated multimodal sensor package.

In the example shown in FIG. 17, the multiple sensors disposed on detector assembly 1710 include an imaging sensor 1712, an illuminance sensor 1714, a LiDAR sensor 1716, and one or more other sensors 1718. An imaging sensor 1712 can include a detector that detects light signals and convert the light signals to electrical signals to form images. Therefore, imaging sensor 1712 can be used as a part of cameras. The imaging sensor 1712 can be a CCD sensor, a CMOS sensor, an active-pixel sensor, a thermal-imaging sensor, etc. An illuminance sensor 1714 can include a detector that facilitates measuring the amount of light falling on a surface per unit area, referred to as illuminance. Illuminance can be represented for example, by the amount of lumen per square meter. Illuminance sensor 1714 can include detectors comprising photodiodes, phototransistors, photovoltaic cells, photoresistors, etc. Illuminance sensor 1714 can be used for lighting control, brightness control, environmental monitoring, etc.

LiDAR sensor 1716 can include detectors that detects laser light (e.g., in the infrared wavelength range). The detected laser light can be used to determine the distance of an object from the LiDAR sensor. LiDAR sensor 1716 can be used to generate a 3D point cloud of the surrounding area. The detectors used for a LiDAR sensor can be an avalanche photodiode, Mercury-Cadmium-Telluride (HgCdTe) based infrared detectors, Indium Antimonide (InSb) based detectors, etc. FIG. 17 also illustrates that detector assembly 1710 may include one or more other sensors 1718. These other sensors 1718 can facilitate temperature sensing, chemical sensing, pressure sensing, motion sensing, light sensing, proximity sensing, etc. One or more sensors 1718 can include detectors such as light emitting diodes (LEDs), photoresistors, photodiodes, phototransistors, pinned photodiodes, quantum dot photoconductors/photodiodes, silicon drift detectors, photovoltaic based detectors, avalanche photodiode (APD), thermal based detectors, Bolometers, microbolometers, cryogenic detectors, pyroelectric detectors, thermopiles, Golay cells, photoreceptor cells, chemical-based detectors, polarization-sensitive photodetectors, and graphene/silicon photodetectors, etc.

With references to FIGS. 7, 8C, and 17, in some embodiments, the plurality of detectors or sensors of a multimodal sensor (e.g., sensor 750 or 844) can be configured to detect light signals received from the same FoV. For instance, FIG. 7 illustrates that light signals received from the same FoV 770 may include two or more of NIR light, visible light, SWIR light, MWIR light, LWIR light, and other light. These light signals are mixed together but can be detected by the same multimodal sensor 750. For instance, as described above, the mixed light signals can be collected and distributed by device 710, and then separated according to one or more of the light characteristics (e.g., wavelength, polarization, angle of incidence, etc.) by signal separation device 740. The separated light signals can then be detected by a corresponding light sensor included in multimodal sensor 750. In this manner, multimodal detection system 700 provides integrated multimodal sensing capabilities, reducing or eliminating the need for multiple discrete or separate sensors like cameras, LiDARs, thermal imaging devices, etc. This will make the sensing device more integrated and compact, reducing the cost, and improving the sensing efficiency.

Figure 18:
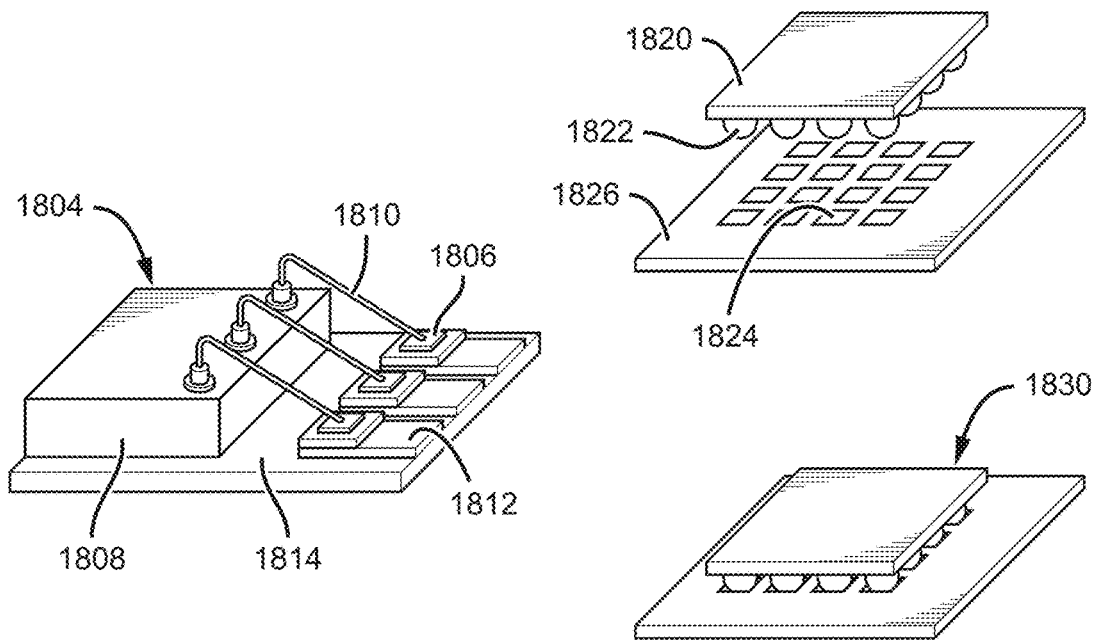
FIG. 18 illustrates example packaging configurations for integrated sensors, according to various embodiments of the present disclosure.

As described above, multimodal sensor 750 can include an integrated sensor array comprising multiple sensors having different types. FIG. 18 illustrates example packaging configurations for integrated sensors, according to various embodiments of the present disclosure. As shown in FIG. 18, a multimodal sensor device 1804 may include a plurality of sensors 1806, each of which is disposed on a heatsink 1812. The detectors 1806 may be of the same type of different types. Each of the sensors 1806 can be wired bonded to an integrated circuit chip 1808. The IC chip 1808 can be used to process electrical signals generated by the sensors 1806, thereby implementing a readout circuitry. The IC chip 1808 can further include other signal processing circuits such as rendering images, performing digital signal processing functions, etc. In this configuration, the sensor array is integrated with the readout circuitry in the same device package (e.g., both IC chip 1808 and sensor array 1806 are disposed on the same PCB 1814). In other embodiments, the sensor array and the readout circuitry may be individually packaged in separate modules. The two separate modules can then be mounted to a PCB board so that signals can be passed between the two modules.

FIG. 18 also illustrates another packaging configuration where the readout circuits 1820 are disposed in one semiconductor chip and the integrated sensor array 1824 are disposed in another semiconductor chip 1826. The two chips 1820 and 1826 are bonded together via flip-chip technologies so that electrical signals can be delivered from the sensor array 1824 to the readout circuits 1820. Once bonded, the two chips 1820 and 1826 can be packaged together as a single device 1830. It is understood that other packaging techniques can also be used, for example, through-hole packaging, surface-mounting packaging, ball grid array packaging, chip-scale packaging, etc.

Figure 19:
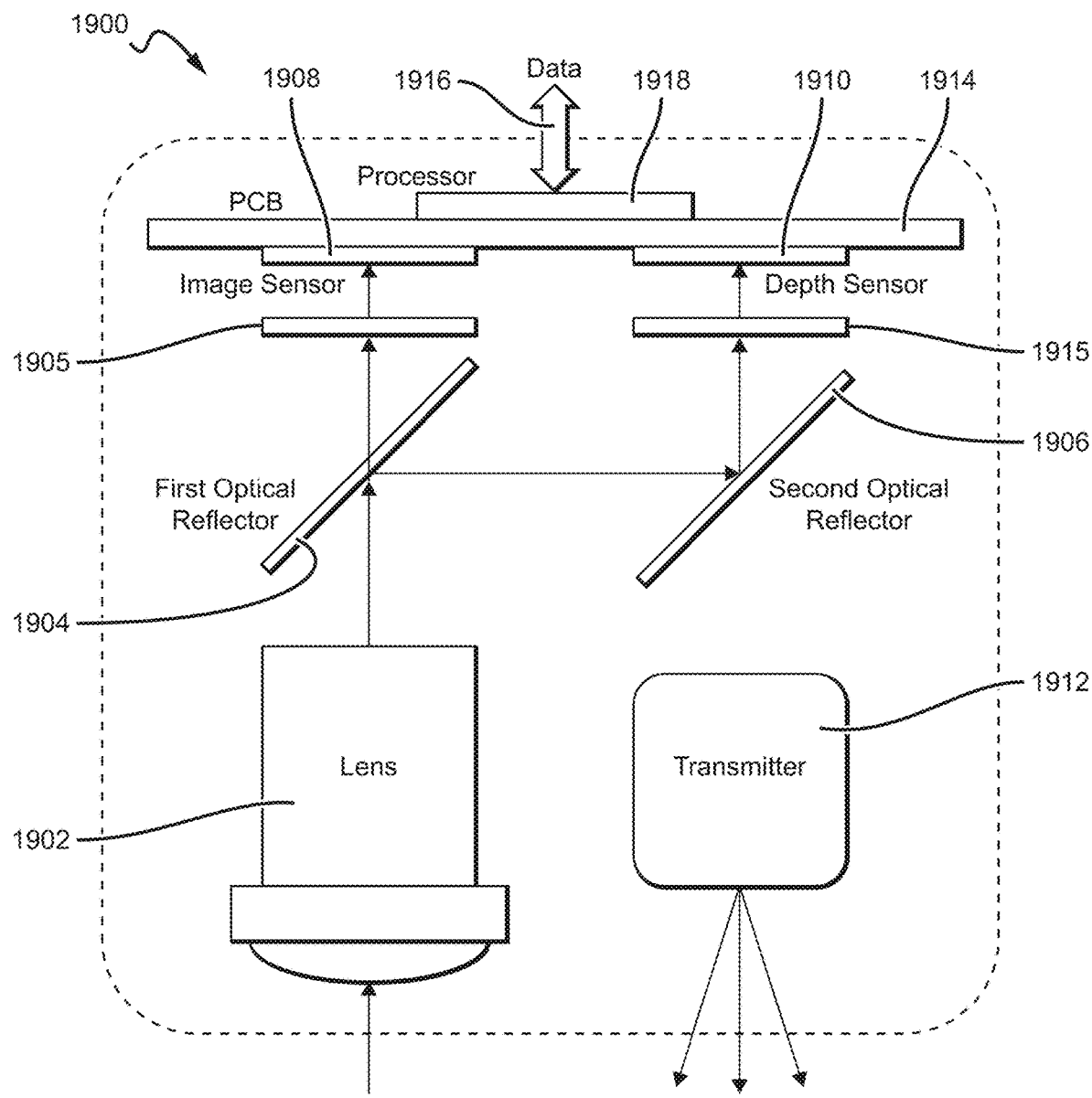
FIG. 19 a block diagram illustrating an example multimodal detection system having integrated sensors in accordance with some embodiments of the present disclosure.

FIG. 19 a block diagram illustrating an example multimodal detection system 1900 for implementing at least a part of the multimodal detection system 700 in accordance with some embodiments of the present disclosure. System 1900 may also be referred to as a compact perception device. System 1900 comprises a lens 1902, a first optical reflector 1904, a second optical reflector 1906, an image sensor 1908, a depth sensor 1910, a transmitter 1912, a printed circuit board (PCB) 1914, a data bus 1916, and a processor 1918. As shown in FIG. 19, transmitter 1912 is configured to emit laser light to an FOV external to compact perception device 1900. Transmitter 1912 can be implemented by one or more of laser source 310, transmitter 320, steering mechanism 340, and control circuitry 350 as described above. For example, transmitter 1912 can include at least a part of a flash LiDAR device, at least a part of a scanning LiDAR device, or any type of device that emits laser light. Transmitter 1912 can perform optical, mechanical, and/or electrical steering of laser light to the FOV. For instance, transmitter 1912 can include at least one solid state based LiDAR device configured to perform electronic scanning. Transmitter 1912 may also include a LiDAR device configured to perform optical scanning using one or more optical components such as polygon mirror, oscillation mirror, and/or other steering mechanisms described above. Transmitter 1912 can be configured to perform scanning in one or two dimensions.

In one embodiment, the laser light emitted by transmitter 1912 comprises near infrared range (NIR) light or infrared light. The light may be continuous wave light or pulsed laser light. Near infrared light is electromagnetic radiation with a wavelength that lies between about 780 to about 950 nm and is invisible to the human eye. It is understood that the laser light emitted by transmitter 1912 can comprise infrared light having wavelengths from 780 nm to 1 mm. While the below descriptions use NIR light as an illustration, it is further understood that the descriptions also apply to infrared light and/or light having wavelengths other than the visible light.

With continued reference to FIG. 19, the laser light emitted from transmitter 1912 may be reflected or scattered by one or more objects in an FOV (not shown). The reflected or scattered light forms return light, similar to those shown in FIGS. 5A-5C. The return light may have substantially the same wavelength as the emitted light. Thus, in one embodiment, the return light is also NIR light. The return light can be collected by lens 1902.

In addition to collecting NIR light, lens 1902 can also be configured to collect visible light. The visible light can have a wavelength range of about 380 nm to about 750 nm. Lens 1902 may be configured such that it can collect both visible light and NIR light. For example, the focal length of lens 1902 can be configured to accommodate the slightly longer wavelength of the NIR light as compared to the visible light. In some examples, lens 1902 may include one or more lens or a lens group. Some of the lenses in the lens group may be optimized for focus the visible light, and some other lenses in the lens group may be optimized for focus the NIR light. The lens in the lens group may thus have different focal lengths.

As shown in FIG. 19, both visible light and NIR light are directed from lens 1902 to first optical reflector 1904. While FIG. 19 shows that first optical reflector 1904 is directly coupled to lens 1902, it is understood that one or more additional optical components may be disposed between lens 1902 and first optical reflector 1904 to redirect light as desired. In one example, first optical reflector 1904 can be located based on the NIR light focal length of lens 1902 such that the collected NIR light is focused onto first optical reflector 1904. Lens 1902 can further be configured such that the visible light, or a substantial portion of it, passes through first optical reflector 1904 and focuses onto image sensor 1908. In some examples, device 1900 further comprises a lens group 1905 and a lens group 1915 for correcting optical aberration caused by different wavelengths. Each of lens groups 1905 and 1915 may include any combination of one or more lens (e.g., convex lens, concave lens, spherical lens, aspherical lens, wide angle lens, etc.). For example, the visible light directed by lens 1902, due to its shorter wavelength, may refract more than the NIR light. Therefore, the visible light passing through lens 1902 may not be focused properly onto image sensor 1905. Lens group 1905 can be positioned between first optical reflector 1904 and image sensor 1905 to properly focus the visible light to image sensor 1908.

In one embodiment, first optical reflector 1904 can be configured to reflect a substantial portion of the NIR light directed by lens 1902 and pass a substantial portion of the visible light directed by lens 1902. One example of first optical reflector 1904 is a dichroic mirror that has significant different reflection or transmission properties at two different wavelengths. A dichroic mirror can pass a substantial portion of light having one wavelength and reflect a substantial portion of light having another wavelength. For example, first optical reflector 1904 can be primarily an infrared mirror having metallic coatings such as Aluminum, Silver, or Gold, for reflecting a substantial portion of the NIR light. First optical reflector 1904 can further have protective coatings such as SiO or SiO2. In some examples, first optical reflector 1904 may also have a layer of anti-reflection coating to allow the visible light to pass through. The AR coating may be provided at a certain area (e.g., center area) or all areas of first optical reflector 1904. The AR coating may be configured according to the visible light wavelength. First optical reflector 1904 can also be a partial reflection mirror.

As shown in FIG. 19, the visible light passes through first optical reflector 1904 and is directed to image sensor 1908 (e.g., via lens set 1905). Image sensor 1908 can be a complementary metal oxide semiconductor (CMOS) image sensor or a CCD image sensor. The image sensor 1908 detects the visible light and converts the light signals to electrical signals. The collected NIR light, or a substantial portion thereof, is reflected from first optical reflector 1904 to a second optical reflector 1906. Second optical reflector 1906 can reflect light that is directed by first optical reflector 1904 to a depth sensor 1910. In this case, second optical reflector 1906 reflects the NIR light toward depth sensor 1910. In some examples, the NIR light redirected by second optical reflector 1906 may not be properly focused on depth sensor 1910. A lens group 1915 may be disposed between second optical reflector 1906 and depth sensor 1910 to properly focus the NIR light onto depth sensor 1910. Second optical reflector 1906 can also be an infrared mirror having metallic coatings such as Aluminum, Silver, or Gold, for reflecting a substantial portion of the NIR light. It is understood that while FIG. 19 shows that the NIR light is reflected by first optical reflector 1904 to second optical reflector 1906 directly, one or more additional optics may be disposed in between to redirect light as desired. Similarly, one or more additional optics may be disposed in between second optical reflector 1906 and depth sensor 1910.

Depth sensor 1910 is configured to detect the NIR light reflected by first optical reflector 1904 and directed by second optical reflector 1906. Depth sensor 1910 can include any of the detector described above. For example, depth sensor 1910 can include a PIN based light detector structure, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a depth sensor 1910, Si, InGaAs, and/or Si/Ge based materials can be used. Depth sensor 1910 converts NIR light signals to electrical signals.

With reference still to FIG. 19, the receiving paths for visible light and for NIR light are partially shared by using a same lens 1902 (or a lens group), first optical reflector 1904, and second optical reflector 1906. Further, image sensor 1908 and depth sensor 1914 can be mounted to the same printed circuit board (PCB) 1914. Image sensor 1908 converts visible light to electrical signals for generating a camera image and therefore functions as a camera. Depth sensor 1914 converts NIR light to electrical signals for generating a 3D point cloud and therefore functions as a LiDAR device. Accordingly, by sharing many of the components for generating both a camera image and a LiDAR point cloud, the entire multimodal detection system 1900 can be very compact in size. Moreover, by using a same lens 1902 to collect both visible light and NIR light, the FOVs for both image sensor 1908 and depth sensor 1914 are substantially the same. Accordingly, this reduces or eliminates the requirement to perform calibration between the depth sensor 1914 and the image sensor 1908. As a result, the complexity of data fusion between data generated by the two sensors is greatly reduced. The images captured by the image sensor 1908 and the depth sensor 1914 can be naturally matched by this configuration.

As described above, image sensor 1908 generates image data using visible light collected by lens 1902 and passed by first optical reflector 1904. Depth sensor 1910 generates depth data using NIR light collected by lens 1902 and reflected by both first optical reflector 1904 and second optical reflector 1906. Image data may represent the 2-dimensional view of the FOV and include color information (red, green blue, or RGB). Depth data may represent a 3-dimension view of the FOV by including distance measurement (also referred to as depth).

With reference to still to FIG. 19, in some embodiments, multimodal detection system 1900 further includes an electrical circuitry comprising a PCB 1914. A processor 1918 can be mounted on PCB 1914 (on the same side as the image sensor 1908 and depth sensor 1910, or on a different side of PCB). Electrical wires can be routed from image sensor 1908 and depth sensor 1910 to processor 1918. In one embodiment, a single processor 1918 can be used to combine the image data and the depth data, thereby making the multimodal detection system 1900 more compact. Compared to using a separate camera device and a separate LiDAR device, which may include their own processors, multimodal detection system 1900 improves the processing efficiency and reduces processing power consumption. The output data from processor 1918 can be fused or merged data that include both color information and depth information of the FOV (e.g., red, green, blue, and depth data, or RGBD data). As shown in FIG. 19, in one embodiment, the output data from processor 1918 can be communicated to a data bus 1916, which delivers the data to other systems for further processing.

In some embodiments, at least a part of multimodal detection system 1900 is steerable. For example, transmitter 1912 and/or lens 1902 may be steerable to better direct light to, and collect light from, a desired FOV. In some embodiments, the entire multimodal detection system 1900 is steerable to improve the light collection efficiency. For example, multimodal detection system 1900 may be placed on a moveable platform that is configured to move and/or rotate at any directions and/or angles.

Figure 20:
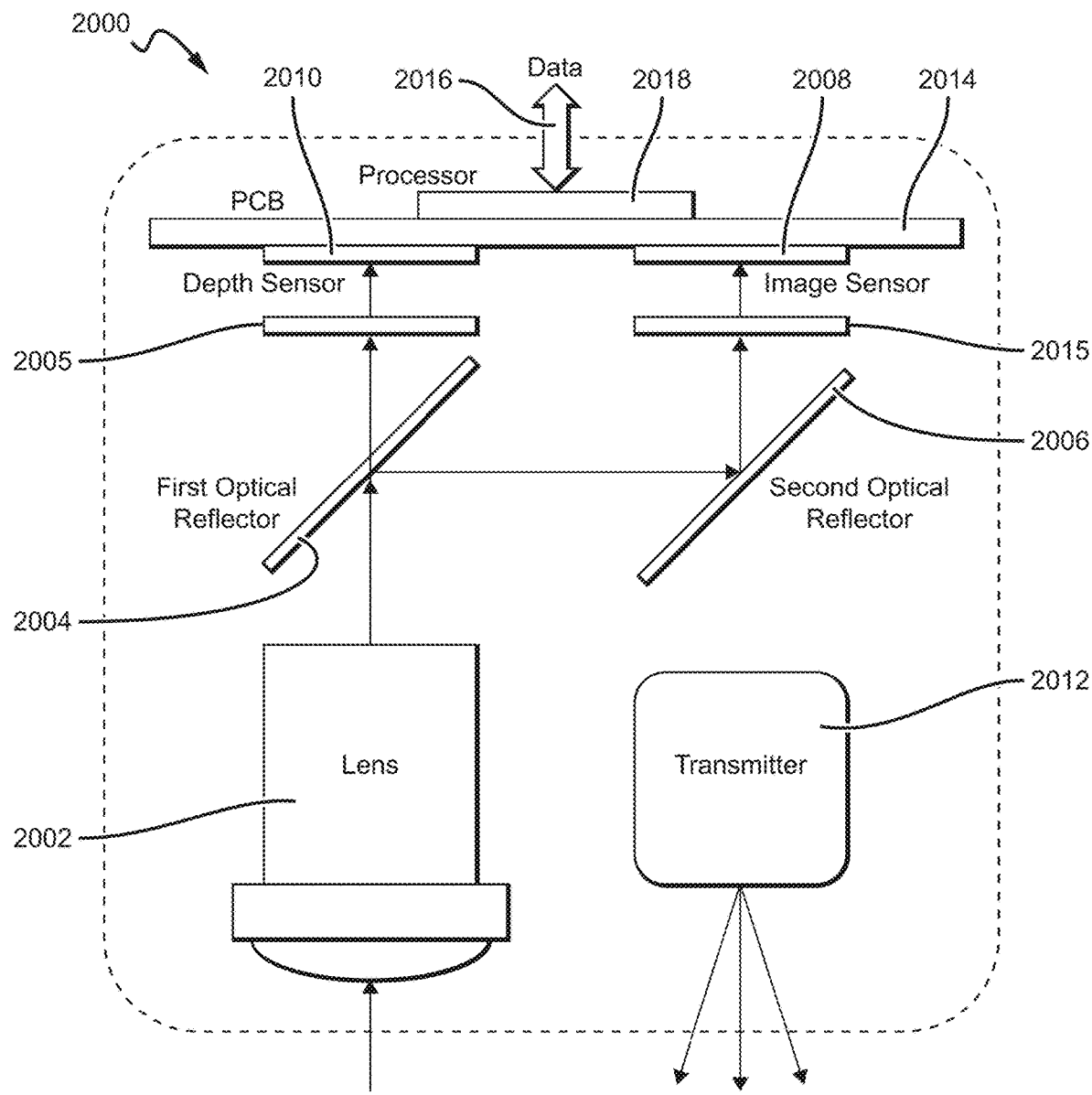
FIG. 20 is a block diagram illustrating another example multimodal detection system having integrated sensors in accordance with one embodiment of the present disclosure.
Figure 21:
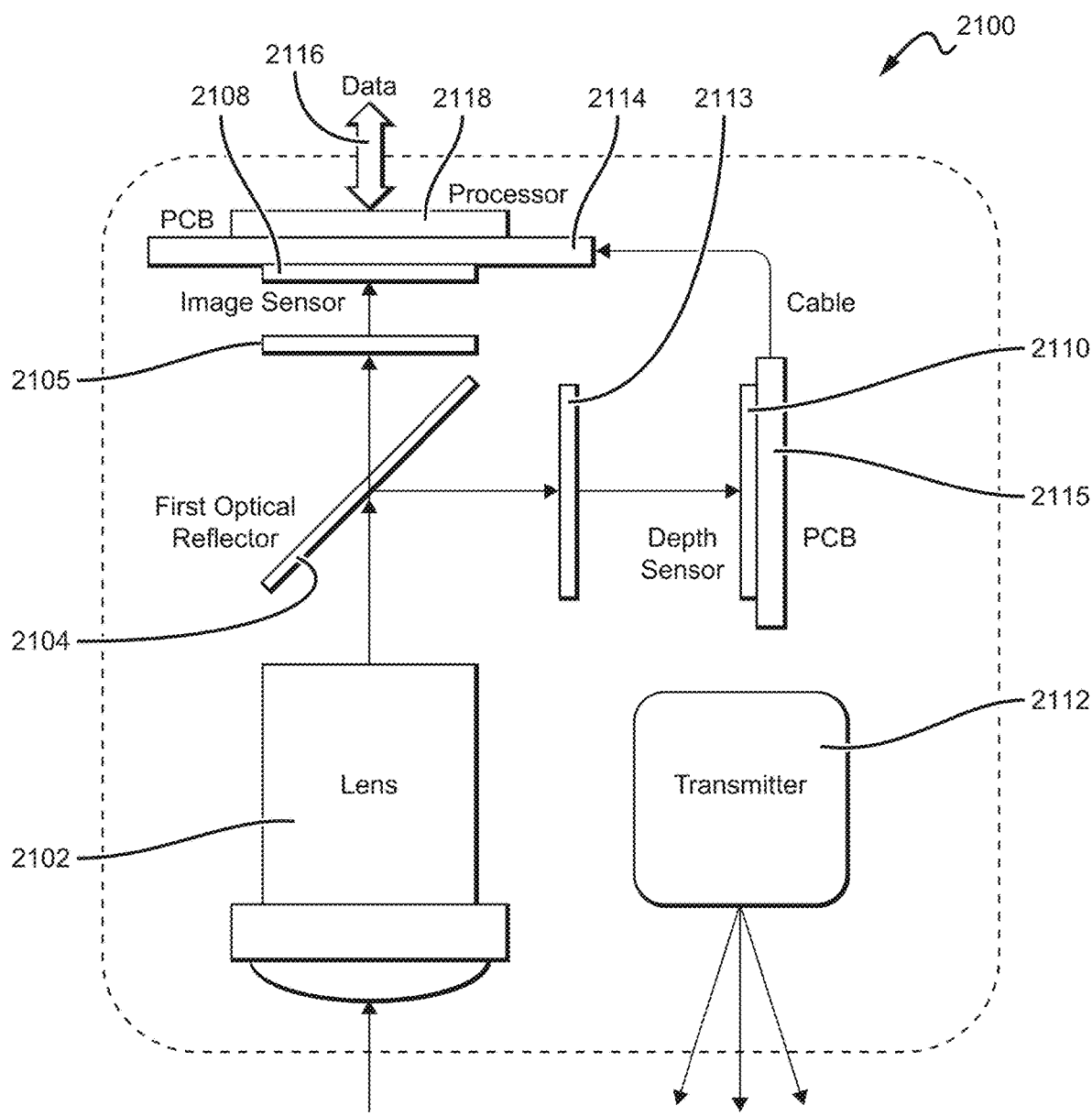
FIG. 21 is a block diagram illustrating another example multimodal detection system having integrated sensors in accordance with one embodiment of the present disclosure.

As described above and shown in FIG. 19, in multimodal detection system 1900, first optical reflector 1904 passes the visible light and reflects the NIR light. FIGS. 20 and 21 illustrate certain alternative configurations. For example, FIG. 20 shows a multimodal detection system 2000, which has a different configuration than multimodal detection system 1900. Similar to system 1900, multimodal detection system 2000 also includes a lens 2002, a first optical reflector 2004, a second optical reflector 2006, an image sensor 2008, a depth sensor 2010, a transmitter 2012, a printed circuit board (PCB) 2014, a data bus 2016, and a processor 2018. Image sensor 2008, depth sensor 2010, transmitter 2012, printed circuit board (PCB) 2014, data bus 2016, and processor 2018 can be substantially the same or similar to their counterparts shown in FIG. 19, and are thus not repeatedly described.

In the configuration shown in FIG. 20, first optical reflector 2004 passes the collected NIR light and reflects the collected visible light. The NIR light is then directed to depth sensor 2010 and the visible light is directed to second optical reflector 2006. Second optical reflector 2006 reflects the visible light to image sensor 2008. Thus, compared to the configuration shown in FIG. 19, the two optical reflectors shown in FIG. 20 are essentially swapped in position with each other. Correspondingly, the image sensor and depth sensor of device 2000 are also swapped in position.

In the configuration shown in FIG. 20, first optical reflector 2004 can be located based on the visible light focal length of lens 2002 such that the visible light is focused onto first optical reflector 2004. Lens 2002 can further be configured such that the NIR light, or a substantial portion of it, passes through first optical reflector 2004 and focuses on depth sensor 2010. Similar to described above, lens 2002 can also include a lens group with one or more lens optimized for focusing visible light and one or more other lenses optimized for focusing the NIR light. In some examples, similar to device 1200, device 2000 may further comprises a lens group 2005 disposed between first optical reflector 2004 and depth sensor 2010, and/or another lens group 2015 disposed between second optical reflector 2006 and image sensor 2008 for correcting optical aberration caused by different wavelengths. Each of these lens groups 2005 and 2015 may include any combination of one or more lens (e.g., convex lens, concave lens, spherical lens, aspherical lens, wide angle lens, etc.).

For the configuration in FIG. 20, as described above, first optical reflector 2004 can be configured to reflect a substantial portion of the visible light directed by lens 2002 and pass a substantial portion of the NIR light directed by lens 2002. One example of first optical reflector 2004 is a dichroic mirror that has significant different reflection or transmission properties at two different wavelengths. For example, first optical reflector 2004 can be primarily a visible light mirror while being substantially transparent to NIR light having longer wavelength. In some examples, first optical reflector 2004 may also have a layer of NIR anti-reflection coating to allow the NIR light to pass through. The NIR AR coating may be provided in certain (e.g., center area) or all areas of first optical reflector 2004. First optical reflector 2004 can also be a partial reflection mirror.

In the embodiments shown in FIGS. 19 and 20, both the depth sensor and the image sensor are coupled to the same printed circuit board (PCB). An alternative configuration is shown in FIG. 21. FIG. 21 illustrates a multimodal detection system 2100, which includes a lens 2102, a first optical reflector 2104, an image sensor 2108, a depth sensor 2110, a transmitter 2112, a first printed circuit board (PCB) 2114, a data bus 2116, a second PCB 2115, and a processor 2118. Lens 2102, first optical reflector 2104, image sensor 2108, depth sensor 2110, transmitter 2112, first PCB 2114, data bus 2116, and processor 2118 can be substantially the same or similar to their counterparts shown in FIGS. 19 and 20, and are thus not repeatedly described.

In this embodiment shown in FIG. 21, first optical reflector 2104 reflects a substantial portion of NIR light directed by lens 2102. The reflected NIR light is directed to depth sensor 2110 directly, without the need of a second optical reflector. Depth sensor 2110 is mounted to a second PCB 2115. In some examples, second PCB 2115 can be a separate and distinct PCB from first PCB 2114. Thus, image sensor 2108 and depth sensor 2110 are not mounted to the same PCB or aligned at the same plane. Instead, they can be positioned to be perpendicular to each other or at any other desired angles with respect to each other. Image sensor 2108 and depth sensor 2110 may be coupled to separate PCBs or may be coupled to a single flexible PCB. In this embodiment, a cable, or a flexible PCB, may connect the two PCBs 2114 and 2115 such that data can be transmitted between them. In some examples, similar to those shown in FIG. 12, system 2100 further comprises a lens group 2105 and a lens group 2113 for correcting optical aberration caused by different wavelengths. Each of lens groups 2105 and 2113 may include any combination of one or more lens (e.g., convex lens, concave lens, spherical lens, aspherical lens, wide angle lens, etc.). Lens group 2105 can facilitate to properly focus visible light onto image sensor 2108 and lens group 2113 can facilitate to properly focus the NIR light onto depth sensor 2110. It is understood that the embodiment shown in FIG. 21 can also be changed such that the first optical reflector 2104 reflects visible light, instead of NIR light. Correspondingly, depth sensor 2110 can be mounted to PCB 2114 and image sensor 2108 can be mounted to PCB 2115. Other configurations are also possible. The embodiment shown in FIG. 21 can further reduce the size of the compact perception device because it eliminates the second optical reflector.

While FIGS. 19-21 illustrate several embodiments of a multimodal detection system, it is understood that a multimodal detection system can have other configurations. For example, one or more optical reflectors, one or more PCBs, one or more processors may be used and/or configured differently. The lens can be placed at different positions depending on vehicle mounting location of the compact perception device. Moreover, in some embodiments, a multimodal detection system is disposed in a single housing. For example, the lens, the transmitter, optical reflector(s), PCB(s), processor(s), the image sensor, the depth sensor can all be packaged in a same housing. In other embodiments, some of the components may be separately packaged in a different housing and/or located at a different part of the vehicle to which the multimodal detection system is mounted.

Figure 22:
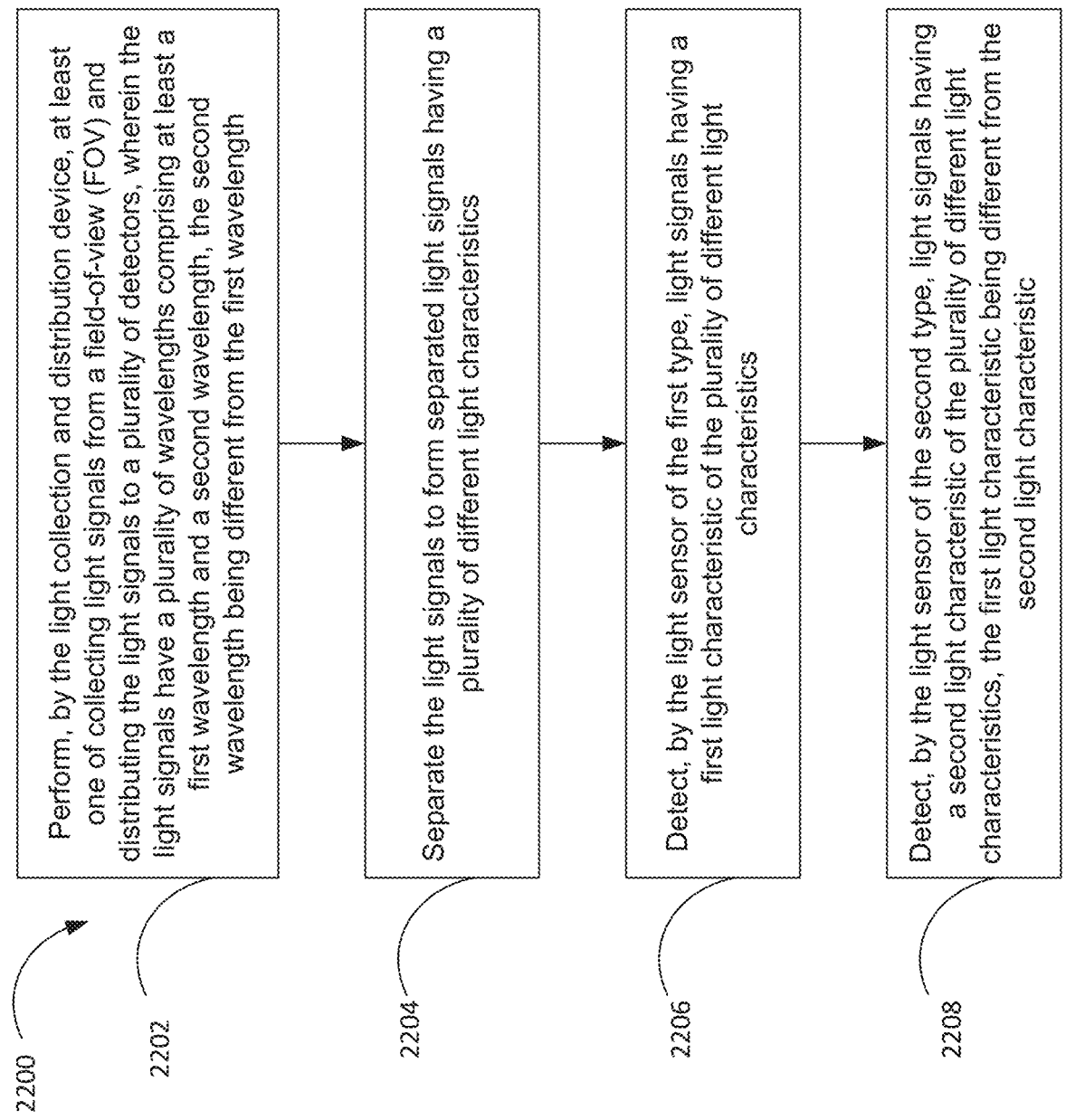
FIG. 22 is a flowchart illustrating a method performed by a multimodal detection system in accordance with some embodiments of the present disclosure.

FIG. 22 is a flowchart illustrating a method 2200 performed by a multimodal detection system (e.g., system 700 shown in FIG. 7), in accordance with some embodiments of the present disclosure. Method 2200 may begin with step 2202, in which a light collection and distribution device (e.g., device 710 in FIG. 7) performs at least one of collecting light signals from a field-of-view (FOV) and distributing the light signals to a plurality of detectors. The methods of collecting and distributing light signals are described above and thus not repeated described. The light signals received by the light collection and distribution device have a plurality of wavelengths comprising at least a first wavelength and a second wavelength. The second wavelength can be different from the first wavelength. For instance, the first wavelength may be in the NIR wavelength range, and the second wavelength may be in the visible light wavelength range.

With continued reference to FIG. 22, in an optional step 2204, a signal separation device (e.g., device 730 in FIG. 7) can separate the light signals to form separated light signals having a plurality of different light characteristics. The manner of the signal separations is described above and thus not repeatedly described. In step 2206, a light sensor of a first type can detect light signals having a first light characteristic of a plurality of different light characteristics. In one example, the light sensor of the first type is configured to perform distance measuring based on light signals having the first wavelength. For example, the light sensor of the first type may be a LiDAR sensor. In step 2208, a light sensor of a second type can detect light signals having a second light characteristic of the plurality of different light characteristics. The first light characteristic can be different from the second light characteristic.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A system for multimodal detection, comprising:
   a light collection and distribution device configured to perform at least one of collecting light signals from a field-of-view (FOV) and distributing the light signals to a plurality of sensors, wherein the light signals have a plurality of wavelengths comprising at least a first wavelength and a second wavelength, the second wavelength being different from the first wavelength, wherein one or both of the light collection and distribution device and a signal separation device are configured to separate the light signals to obtain light signals having the first wavelength and light signals having the second wavelength, and direct the light signals having the first wavelength and light signals having the second wavelength to different types of sensors of the plurality of sensors;
   a multimodal sensor comprising the plurality of sensors, wherein the plurality of sensors comprises at least a light sensor of a first type and a light sensor of a second type, wherein:
      the light sensor of the first type is configured to detect light signals having a first light characteristic of a plurality of light characteristics, the light sensor of the first type being configured to perform distance measuring based on light signals having the first wavelength;
      the light sensor of the second type is configured to detect light signals having a second light characteristic of the plurality of light characteristics, the first light characteristic being different from the second light characteristic; and
      the light sensor of the first type and the light sensor of the second type are both mounted to a first side of a printed circuit board (PCB); and
   a processor mounted to a second side of the PCB such that the processor and the light sensors of the first type and second type share the PCB, and the second side of the PCB is opposite to the first side of the PCB, the processor being configured to generate fused data based on depth data from the light sensor of the first type and image data from the light sensor of the second type, wherein the multimodal sensor is more compact in size compared to using discrete sensors each having a processor.

2. The system of claim 1, further comprising:
   a light source configured to provide light including at least one of: visible light, near infrared (NIR) light, short wavelength IR (SWIR) light, medium wavelength IR (MWIR) light, and long wavelength IR (LWIR) light; and
   a transmitter configured to transmit the light toward the FOV, wherein the light signals having the first wavelength are formed based on the transmitted light.

3. The system of claim 2, wherein the light source comprises an array of light emitting elements, and wherein the plurality of sensors are positioned corresponding to the array of light emitting elements.

4. The system of claim 1, further comprising one or more optical or electrical scanners configured to perform at least one of a point scan or a line scan of the FOV.

5. The system of claim 4, wherein the one or more optical or electrical scanners are controlled to scan a region of interest (ROI) with a higher resolution than scanning a non-ROI.

6. The system of claim 1, wherein the light collection and distribution device comprises one or more of: refraction optics, diffractive optics, and reflection optics.

7. The system of claim 6, wherein the refraction optics comprises a beam splitter configured to direct a portion of the light signals to a first sensor of the plurality of sensors and direct another portion of the light signals to a second sensor of the plurality of sensors.

8. The system of claim 6, wherein the diffractive optics comprises grating configured to separate the light signals having at least one of different wavelengths, different intensities, or different polarizations.

9. The system of claim 6, wherein the reflection optics comprises a Newtonian based reflection device configured to direct a portion of the light signals to a first sensor of the plurality of sensors and direct another portion of the light signals to a second sensor of the plurality of sensors.

10. The system of claim 6, wherein the reflection optics comprises a Schmidt-Cassegrain based reflection device configured to direct a portion of the light signals to a first sensor of the plurality of sensors and direct another portion of the light signals to a second sensor of the plurality of sensors.

11. The system of claim 1, wherein the plurality of wavelengths comprises wavelengths in at least two of: a visible light wavelength range, a near infrared (NIR) wavelength range, a short-wavelength infrared range, a mid-wavelength infrared range, and a long infrared wavelength range.

12. The system of claim 1, wherein the signal separation device is configured to separate the light signals to form separated light signals having a plurality of different light characteristics.

13. The system of claim 12, wherein the plurality of different light characteristics comprises one or more of a light wavelength, a light intensity, a light angular direction, and a light polarization.

14. The system of claim 12, wherein the signal separation device comprises a spectrum separation device configured to separate the light signals to form the separated light signals having different wavelengths.

15. The system of claim 12, wherein the signal separation device comprises a spatial separation device configured to separate the light signals to form the separated light signals corresponding to at least one of different spatial positions of the plurality of sensors or different angular directions of the light signals.

16. The system of claim 15, wherein the spatial separation device comprises optical fibers or a micro lens array configured to separate the light signals to form the separated light signals and direct the separated light signals to respective sensors of the plurality of sensors.

17. The system of claim 12, wherein the signal separation device comprises a polarization separation device configured to separate the light signals to form the separated light signals having different polarizations.

18. The system of claim 1, wherein the plurality of sensors are positioned at a focal plane of the light collection and distribution device and the light signals are directed to the focal plane without a signal separation device.

19. The system of claim 1, wherein at least two of the plurality of sensors of the multimodal sensor are mounted to two different device packages, two different modules, or two different PCBs.

20. The system of claim 1, wherein the plurality of sensors comprises detectors forming a detector array.

21. The system of claim 20, wherein the detector array comprises a hybrid integration of different types of detectors in a single semiconductor chip.

22. The system of claim 20, wherein the detector array is electrically coupled to a readout circuitry in a same device package, or wherein the detector array is electrically coupled to the readout circuitry via wire bonding or flip-chip bonding.

23. The system of claim 20, wherein the detector array is disposed in a separate module from a readout circuitry.

24. The system of claim 20, wherein the detector array comprises different types of detectors disposed in one or more semiconductor dies or a portion of a semiconductor wafer.

25. The system of claim 20, wherein the detector array and a readout circuitry are both disposed in a semiconductor wafer.

26. The system of claim 1, wherein the light sensor of the first type is configured to detect light signals having NIR wavelengths, and the light sensor of the second type is configured to detect light signals having a visible light wavelength range, a near infrared (NIR) wavelength range, a short-wavelength infrared range, a mid-wavelength infrared range, or a long infrared wavelength range.

27. A method performed by a multimodal detection system comprising a light collection and distribution device and a multimodal sensor comprising a plurality of sensors having at least a light sensor of a first type and a light sensor of a second type, the method comprising:
performing, by the light collection and distribution device, at least one of collecting light signals from a field-of-view (FOV) and distributing the light signals to the plurality of sensors, wherein the light signals have a plurality of wavelengths comprising at least a first wavelength and a second wavelength, the second wavelength being different from the first wavelength;
separating the light signals to obtain light signals having the first wavelength and light signals having the second wavelength;
directing the light signals having the first wavelength and light signals having the second wavelength to different types of sensors of the plurality of sensors;
detecting, by the light sensor of the first type, light signals having a first light characteristic of a plurality of light characteristics;
detecting, by the light sensor of the second type, light signals having a second light characteristic of the plurality of light characteristics, the first light characteristic being different from the second light characteristic,
wherein the light sensor of the first type and the light sensor of the second type are both mounted to a first side of a printed circuit board (PCB); and
generating, by a processor mounted to a second side of the PCB, fused data based on depth data from the light sensor of the first type and image data from the light sensor of the second type, wherein the processor and the light sensors of the first type and second type share the PCB, and the second side of the PCB is opposite to the first side of the PCB, and wherein the multimodal sensor is more compact in size compared to using discrete sensors each having a processor.

28. An integrated sensing system comprising a system for multimodal detection, the system comprising:
a light collection and distribution device configured to perform at least one of collecting light signals from a field-of-view (FOV) and distributing the light signals to a plurality of sensors, wherein the light signals have a plurality of wavelengths comprising at least a first wavelength and a second wavelength, the second wavelength being different from the first wavelength, wherein one or both of the light collection and distribution device and a signal separation device are configured to separate the light signals to obtain light signals having the first wavelength and light signals having the second wavelength, and direct the light signals having the first wavelength and light signals having the second wavelength to different types of sensors of the plurality of sensors;

a multimodal sensor comprising the plurality of sensors, wherein the plurality of sensors comprises at least a light sensor of a first type and a light sensor of a second type, wherein:
- the light sensor of the first type is configured to detect light signals having a first light characteristic of a plurality of light characteristics, the light sensor of the first type being configured to perform distance measuring based on light signals having the first wavelength;
- the light sensor of the second type is configured to detect light signals having a second light characteristic of the plurality of light characteristics, the first light characteristic being different from the second light characteristic; and
- the light sensor of the first type and the light sensor of the second type are both mounted to a first side of a printed circuit board (PCB); and a processor mounted to a second side of the PCB such that the processor and the light sensors of the first type and second type share the PCB, and the second side of the PCB is opposite to the first side of the PCB, the processor being configured to generate fused data based on depth data from the light sensor of the first type and image data from the light sensor of the second type, wherein the multimodal sensor is more compact in size compared to using discrete sensors each having a processor.

29. A vehicle comprising an integrated sensing system having a system for multimodal detection, the system for multimodal detection comprising:

a light collection and distribution device configured to perform at least one of collecting light signals from a field-of-view (FOV) and distributing the light signals to a plurality of sensors, wherein the light signals have a plurality of wavelengths comprising at least a first wavelength and a second wavelength, the second wavelength being different from the first wavelength, wherein one or both of the light collection and distribution device and a signal separation device are configured to separate the light signals to obtain light signals having the first wavelength and light signals having the second wavelength, and direct the light signals having the first wavelength and light signals having the second wavelength to different types of sensors of the plurality of sensors;

a multimodal sensor comprising the plurality of sensors, wherein the plurality of sensors comprises at least a light sensor of a first type and a light sensor of a second type, wherein:
- the light sensor of the first type is configured to detect light signals having a first light characteristic of a plurality of light characteristics, the light sensor of the first type being configured to perform distance measuring based on light signals having the first wavelength;
- the light sensor of the second type is configured to detect light signals having a second light characteristic of the plurality of light characteristics, the first light characteristic being different from the second light characteristic; and
- the light sensor of the first type and the light sensor of the second type are both mounted to a first side of a printed circuit board (PCB); and a processor mounted to a second side of the PCB such that the processor and the light sensors of the first type and second type share the PCB, and the second side of the PCB is opposite to the first side of the PCB, the processor being configured to generate fused data based on depth data from the light sensor of the first type and image data from the light sensor of the second type, wherein the multimodal sensor is more compact in size compared to using discrete sensors each having a processor.

* * * * *